(12) United States Patent
Horiuchi et al.

(10) Patent No.: US 6,791,271 B2
(45) Date of Patent: Sep. 14, 2004

(54) DISCHARGE LAMP AND METHOD OF PRODUCING THE SAME

(75) Inventors: Makoto Horiuchi, Sakurai (JP); Makoto Kai, Katano (JP); Mamoru Takeda, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 275 days.

(21) Appl. No.: 10/077,954

(22) Filed: Feb. 20, 2002

(65) Prior Publication Data

US 2002/0135305 A1 Sep. 26, 2002

Related U.S. Application Data

(62) Division of application No. 09/270,004, filed on Mar. 16, 1999, now Pat. No. 6,368,175.

(30) Foreign Application Priority Data

Mar. 16, 1998  (JP) .......................................... P10-065014

(51) Int. Cl.[7] .............................. H01J 13/46; H01J 17/16
(52) U.S. Cl. .......................... 315/56; 313/634; 313/636
(58) Field of Search ................................. 313/623–625, 313/636–639, 643, 634; 445/26, 40; 315/56

(56) References Cited

U.S. PATENT DOCUMENTS

| | | | | |
|---|---|---|---|---|
| 4,305,020 A | * | 12/1981 | Nalepa .......................... 315/73 |
| 4,891,555 A | | 1/1990 | Ahlgren et al. ................ 313/64 |
| 5,017,839 A | * | 5/1991 | Arlt et al. ..................... 315/219 |
| 5,108,333 A | | 4/1992 | Heider et al. .................. 445/26 |
| 5,212,424 A | * | 5/1993 | Russell et al. ................ 313/562 |
| 5,327,042 A | * | 7/1994 | Bazin et al. ................... 313/25 |
| 5,541,481 A | | 7/1996 | Yamaguchi et al. ......... 313/638 |
| 5,601,465 A | | 2/1997 | Fukuyo et al. .................. 445/6 |
| 5,670,844 A | | 9/1997 | Yasudaa et al. ............. 313/636 |
| 5,708,328 A | * | 1/1998 | Mathews et al. ............ 313/573 |
| 5,831,388 A | * | 11/1998 | Genz et al. .................. 313/641 |
| 5,905,340 A | * | 5/1999 | Karlotski et al. ............ 313/633 |
| 5,936,349 A | | 8/1999 | Fukai et al. .................. 313/623 |
| 5,986,405 A | * | 11/1999 | De Maagt et al. .......... 313/637 |
| 6,132,279 A | * | 10/2000 | Horiuchi et al. .............. 445/26 |
| 6,211,616 B1 | | 4/2001 | Takeuti et al. ............... 313/637 |

FOREIGN PATENT DOCUMENTS

| | | |
|---|---|---|
| EP | 0 374 679 | 6/1990 |
| EP | 0 641 015 | 3/1995 |
| JP | 57-84548 | 5/1982 |
| JP | 2-220328 | 9/1990 |
| JP | 2-223131 | 9/1990 |
| JP | 6-203795 | 7/1994 |
| JP | 9-102277 | 4/1997 |
| JP | 9-102278 | 4/1997 |
| JP | 9-245738 | 9/1997 |
| WO | 98/07537 | 2/1998 |

OTHER PUBLICATIONS

Patent Abstracts of Japan, vol. 097, No. 008, Aug. 29, 1997 & JP 09 102278 A (Japan Storage Battery Co., Ltd.), Apr. 15, 1997 * abstract *.

* cited by examiner

*Primary Examiner*—Thuy Vinh Tran
(74) *Attorney, Agent, or Firm*—Wenderoth, Lind & Ponack, L.L.P.

(57) ABSTRACT

The present invention provides a long-life discharge lamp by removing the causes of lowering the service life of the discharge lamp owing to quartz glass constituting the discharge lamp and a gas sealed therein, and also provides a discharge lamp production method wherein the mixing of impurities affecting the service life of the discharge lamp is prevented. In the discharge lamp the content of hydrogen, oxygen and their compounds existing in the light-emitting portion is such that the maximum intensity of the light-emitting spectral intensities of the above impurities is $1/1000$ or less of the intensity of the main light-emitting spectrum of the noble gas when glow discharge occurs by supplying a current of 3 mA, and also the content of OH groups included in the quartz glass of the sealing portions is 5 ppm or less by weight.

10 Claims, 16 Drawing Sheets

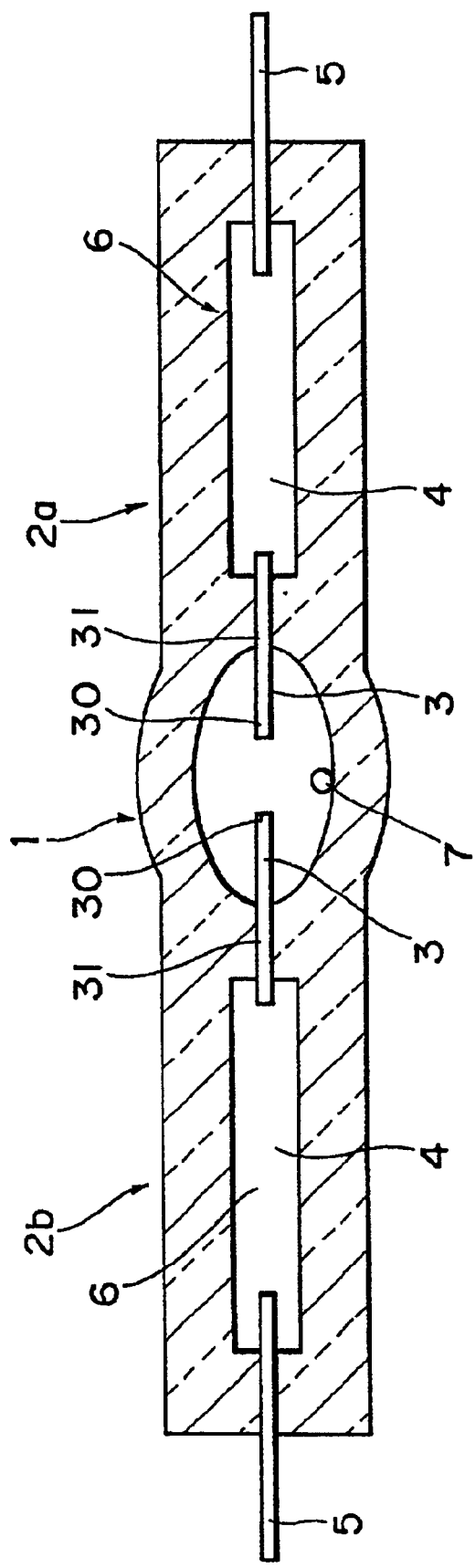

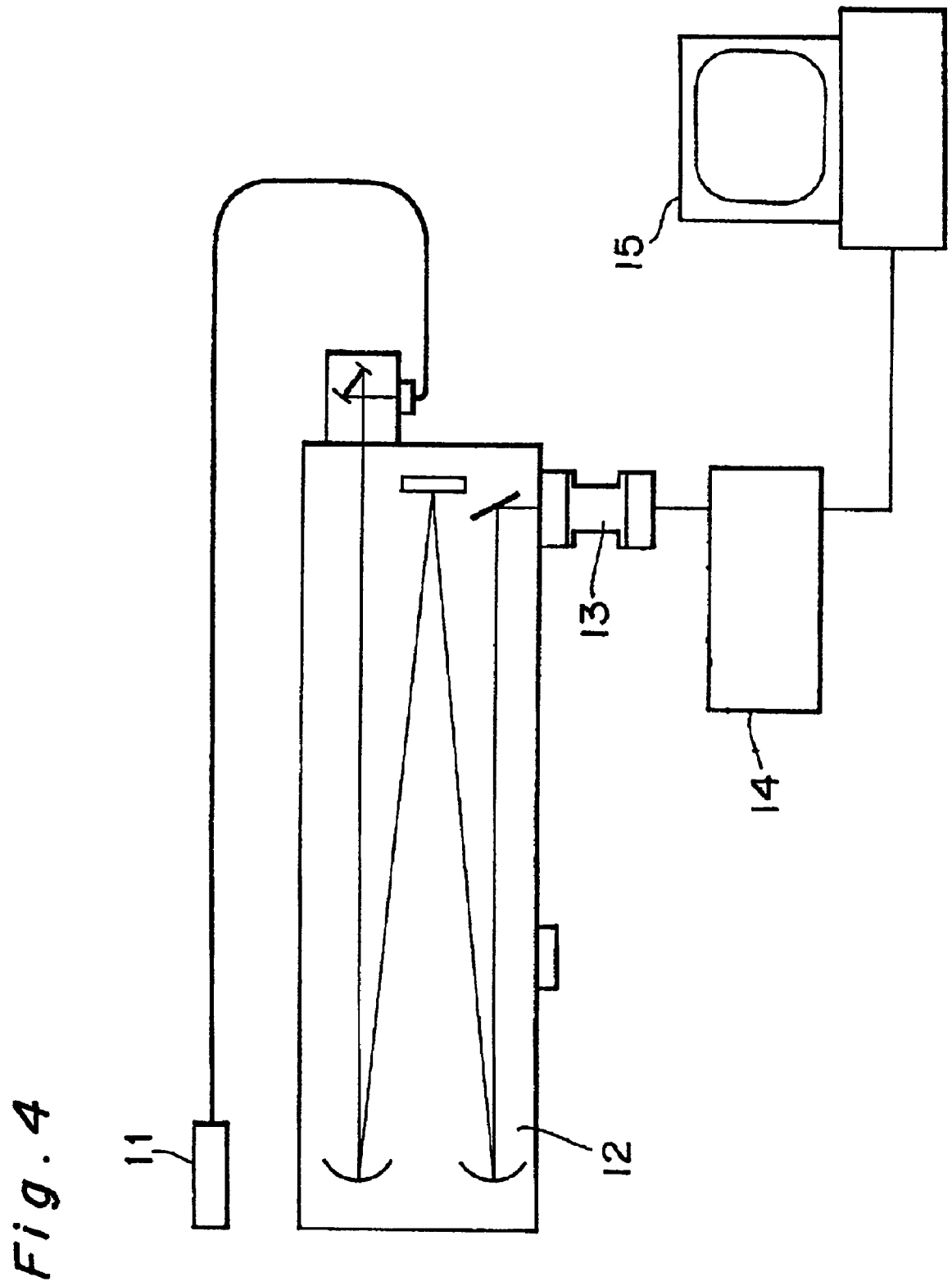

DISCHARGE LAMP AND METHOD OF PRODUCING THE SAME

This application is a divisional of Ser. No. 09/270,004 filed Mar. 16, 1999, which is now U.S. Pat. No. 6,368,175.

FIELD OF THE INVENTION

The present invention relates to a long-life discharge lamp and a method of producing the same.

PRIOR ART

At present, discharge lamps, such as high-pressure mercury lamps and metal halide lamps, are used for various applications, and become widespread and indispensable in the modern society. These days, such discharge lamps are expected to have higher performance to be more beneficial in society. In particular, in order to meet the needs for global environmental conservation, producing discharge lamps having longer service lives is a matter expected most anxiously. Under these circumstances, numerous technologies for extending the lives of discharge lamps have been invented so far.

Generally speaking, in a discharge lamp, a pair of electrodes is sealed in a quartz glass tube, and a discharge space, in which the two electrodes are opposed to each other, is charged with an appropriate noble gas so as to be used as a light-emitting portion. In this light-emitting portion, mercury or a metal halide is charged so that the lamp is used as a mercury lamp or a metal halide lamp. The glass of the lamp is usually formed of quartz glass, and the electrodes are formed of tungsten.

A double-ended high-pressure discharge lamp is disclosed in Japanese Patent Publication JP-A 2-223131, wherein a quartz glass tube is heated at two portions thereof to form two neck portions, a first tungsten electrode having been preformed is disposed at a first neck portion, the quartz glass tube is heated to seal the first electrode, a discharge gas and a light-emitting substance are introduced and one end of the tube is sealed, a second electrode is then disposed at a second neck portion, and the quartz glass tube is heated to seal the second electrode in the same way, whereby the space between he first and second sealing portions is used as a light-emitting portion. In this conventional technology, sealing the electrodes is carried out by heating using a conventional burner, and charging the gas and sealing the ends of the quartz glass tube are carried out in a glove box having a highly clean atmosphere of a charged gas while the quartz glass tube is held therein, and then sealing the second electrode is carried out in the atmospheric air.

Existence of impurities, such as $H_2O$, included in the materials of the components of the discharge lamp is one of the most influential factor in the service life thereof. For example, the quartz glass of the discharge lamp usually includes OH groups, and the OH groups in the quartz glass are released to the discharge space during lamp lighting, and accelerates the evaporation of the tungsten electrodes heated at high temperature (about 3000 K), thereby quickly causing the blacking and devitrification of the light-emitting tube quite frequently, and lowering the service life of the discharge lamp.

Production methods for preventing the OH groups included in the quartz glass from affecting the service life of the lamp in order to extend the service life of the lamp are disclosed, for example, in Japanese Patent Publications JP-A 9-102277 and JP-A 9-102278. These prior art lamp production methods are characterized in that (1) instead of an oxygen-hydrogen burner, a propane-oxygen burner or a plasma burner is used as a heat source for heating the quartz glass in order to reduce the content of OH groups to be mixed during processing and that (2) the quartz glass or the lamp is heated in vacuum after the processing to eliminate the OH groups mixed during the processing by releasing the OH groups as $H_2O$, thereby returning the content of OH groups in the quartz glass to the level obtained before the processing.

As an effect obtained by these production methods, the luminous flux maintenance ratio after 2400 hours of lighting is improved from 85% (in the case when a lamp) is processed by using an oxygen-hydrogen burner) to 91% in accordance with the descriptions of the production methods.

Furthermore, Japanese Patent Publication JP-A 2-220328 discloses a discharge lamp production method wherein high-temperature vacuum heat treatment is carried out at 1200° C. for six hours. In this production method, as shown in FIGS. 16A and 16B, an electrode assembly is inserted from one end of a quartz glass tube 201 having a light-emitting tube portion 206 and opened at both ends. The electrode assembly comprises a tungsten electrode 208, a molybdenum seal foil 209 and a molybdenum lead 210. The portion of the quartz glass tube 201, in which the seal foil 209 is disposed, is heated up to a temperature suited for forming, i.e., about 2200° C. or more, and at the same time, argon Ar is passed through the tube 210 from the open end thereof. When a temperature for crushing is reached, crushing jaws 213 press the quartz glass tube to seal the seal foil 209, thereby forming a first sealing portion 214 (the first electrode sealing step). In this production method, the quartz glass tube 201, in which the first electrode is sealed, is then subjected to high-temperature vacuum heat treatment at 1200° C. for about 6 hours.

In the discharge lamp production methods disclosed in Japanese Patent Publications JP-A 9-102277 and JP-A 9-102278, no consideration is given to impurities included in the lamp component materials other than those included in the quartz glass.

In particular, impurities, such as $H_2O$ included in the sealed-in gas and the light-emitting substance, and adsorbed water on the surface of the quartz glass, are present inside the light-emitting tube immediately after the completion of the lamp, and thus cause adverse effects on the characteristics of the lamp earlier than the impurities released from the quartz glass. For this reason, a problem of being unable to sufficiently prevent deterioration in service life during an early lighting period is caused in the production methods disclosed in Japanese Patent Publications JP-A 9-102277 and JP-A 9-102278.

The above Japanese Patent Publications JP-A 9-102277, JP-A 9-102278 and JP-A 2-220328 disclose methods of reducing the content of OH groups included in the quartz glass by high-temperature vacuum heat treatment in accordance with the conventional lamp production method. When glass is heated at high temperature and affected thermally, the OH groups combined with Si and O (the components of the glass) are generally decomposed and apt to become gas molecules ($H_2$ gas and $H_2O$ gas).

Accordingly, when the high-temperature heat treatment is conducted, the content of OH groups is reduced apparently. In actual practice, however, the reduction is just caused by the change of the OH groups into the forms of $H_2$ gas and $H_2O$ gas, and impurities affecting the service life of the lamp may sometimes not be eliminated actually. In addition, the $H_2$ gas and $H_2O$ gas are apt to diffuse in the glass than the impurities (OH groups) combined with Si and O.

For these reasons, if these gas component atoms are not eliminated sufficiently, impurities released from the glass are increased by the heat treatment, instead of being decreased, thereby causing a problem of accelerating the reduction of the service life of the lamp.

Furthermore, when the electrode assembly (208, 209) and 210) is sealed in the quartz glass tube 201 opened at both ends thereof by heating while argon Ar is flown therethrough as disclosed in Japanese Patent Publication JP-A 2-220328, small argon bubbles are liable to remain at the seal foil 209, thereby causing a problem of being unable to sufficiently maintain hermetical sealing at the sealing portion 14. Moreover, since both ends of the quartz glass tube 201 are open, an atmospheric gas easily flows into the tube together with argon. For example, when the first electrode sealing step shown in FIGS. 16A and 16B is carried out in an atmosphere of air, the air flows into the quartz glass tube 201 together with argon, thereby causing a problem of oxidizing and deteriorating the electrode 208.

SUMMARY OF THE INVENTION

Accordingly, an object of the present invention is to provide a long-life discharge lamp by removing the causes of lowering the service life of the lamp owing to glass constituting the lamp and a gas sealed therein. Another object of the present invention is to provide a method of producing a discharge lamp wherein the mixing of impurities affecting the service life of the lamp is prevented.

A discharge lamp of the present invention comprises a light-emitting portion formed of quartz glass, electrode assemblies projecting into the light-emitting portion, sealing portions in which the electrode assemblies are sealed, and a noble gas hermetically charged in the light-emitting portion.

The content of hydrogen, oxygen and their compounds inside the light-emitting portion and the content of OH groups in the glass of the sealing portions is confined to a constant amount or less, whereby the generation of blackening and devitrification at the glass of the light-emitting portion is delayed in order to extend the service life of the lamp.

More particularly, hydrogen, oxygen and their compounds (water, for example) are not included substantially in the noble gas sealed in the light-emitting portion of the discharge lamp of the present invention. These gas components, if included, scatter molten portions generating at the tips of the electrodes and contaminate the inner wall of the light-emitting tube during the use of the lamp. In the case of the present invention, however, these gas components are confined to prevent the contamination.

In accordance with the present invention, whether the noble gas substantially includes these elements and this compounds thereof or not can be determined by a spectroscopic analysis of light emission in comparison with the noble gas.

In other words, the content of hydrogen, oxygen and their compounds existing in the light-emitting portion should be such that the maximum intensity of the light-emitting spectral spectrum of the content is $1/1000$ or less of the intensity of the main light-emitting spectral spectrum of the noble gas when glow discharge is carried out by supplying a current of 3 mA.

Furthermore, in accordance with the present invention, the content of OH groups included in the quartz glass of the sealing portions should be 5 ppm or less by weight. This make it possible to reduce the content of oxygen hydrogen and their compounds to be released from the glass of the sealing portions to the discharge gas during the use of the lamp.

The present invention is involved in a method of producing a lamp comprising a light-emitting portion formed of quartz glass, electrode assemblies projecting into the light-emitting portion, sealing portions in which the electrode assemblies are sealed, and a noble gas hermetically charged in the light-emitting portion.

The present invention is intended to accomplish a discharge lamp production method wherein the content of hydrogen, oxygen and their compounds (namely, water) existing in the light-emitting portion and the content of OH groups existing in the glass of the sealing portions are confined to constant levels or less.

In other words, a quartz glass tube including an OH group content of 5 ppm or less by weight is used to form a light-emitting portion by heating. The straight tube portion is heated and softened by the irradiation of laser or plasma to seal electrodes in the sealing portions adjacent to the light-emitting portion. Next, a noble gas including a previously reduced content of water is sealed in the glass tube. In comparison with heating and melting caused by a conventional oxygen-hydrogen flame, the irradiation of laser or plasma to the glass tube does not substantially increase the content of OH groups in the electrode sealing portions, and does not increase the content of water in the noble gas. As a result, the generation of blackening and devitrification of the glass at the light-emitting portion during the use of the lamp can be delayed, and the service life of the lamp can be extended.

More particularly, the method of producing the discharge lamp having the above-mentioned structure comprises at least a light-emitting portion forming step wherein a quartz glass tube including an OH group content of 5 ppm or less by weight is heated and softened to form a light-emitting portion having a predetermined shape, an electrode sealing step wherein an electrode assembly is inserted into a straight tube portion adjacent to the light-emitting portion and the straight tube portion is heated and softened to seal the electrode assembly, a dosing step wherein a predetermined amount of a light-emitting substance in a solid or liquid state is inserted into the light-emitting portion at room temperature, and a gas-charging step wherein a predetermined amount of a noble gas is charged and hermetically sealed in the light-emitting portion. In the gas-charging step, a noble gas including a previously reduced content of water is sealed in the glass tube, and in the sealing step, the straight tube portion is heated and softened by the irradiation of laser or plasma to seal the electrode.

The gas-charging step includes a process wherein a noble gas is passed through means for eliminating hydrogen, oxygen and their compounds, and sealed in the light-emitting portion. This elimination means uses a method of cooling the noble gas to low temperature and eliminating the impurities in the form of water in particular.

Furthermore, in the light-emitting portion forming step, the irradiation of laser or plasma is carried out to heat and soften the quartz glass tube, whereby the light-emitting portion can be formed in a predetermined shape without increasing the content of OH groups and the content $H_2O$ dissolved in the glass.

In accordance with the discharge lamp production method of the present invention, in the step of sealing the first and second electrode assemblies at the sealing portions, the quartz glass tube is heated, softened and sealed, after the tube is evacuated, the noble gas is sealed in the glass tube and both ends of the glass tube are sealed. For this reason, the content of OH groups in the sealing portions can be reduced, thereby preventing the electrodes from being oxidized and contaminated. This is effective in preventing the generation of blackening and devitrification at the inner surface of the lamp during the use of the lamp for an extended period of time.

Furthermore, in accordance with the present production method, in the electrode sealing step, the quartz glass tube can be heated and softened by the irradiation of laser or plasma and then sealed. For this reason, the content of OH groups in the glass of the sealing portions can be prevented from increasing. Therefore, it is possible to produce a discharge lamp including a reduced content of OH groups, having a longer service life and free from the problems of blackening and devitrification on the inner surface of the lamp during the use of the lamp for an extended period of time.

In accordance with the present production method, a vacuum heat treatment step of eliminating water adsorbed on the surface of the quartz glass is added, and the surface of the quartz glass is not exposed to the air usually after the vacuum heat treatment step. As a result, the lamp, can be completed in an atmosphere of a dry noble gas or nitrogen gas.

BRIEF DESCRIPTION OF THE DRAWINGS

The present invention is explained in further detail referring to the accompanying drawings, in which:

FIG. 1A is a sectional view showing a discharge lamp in accordance with an embodiment of the present invention;

FIG. 1B is a perspective view showing an electrode assembly used for the discharge lamp;

FIG. 4 is a view showing an instrument for measuring the intensity of light emission at the time of glow discharge in the discharge lamp in accordance with the embodiment of the present invention;

DETAILED DESCRIPTION OF THE INVENTION

Figure 2A:
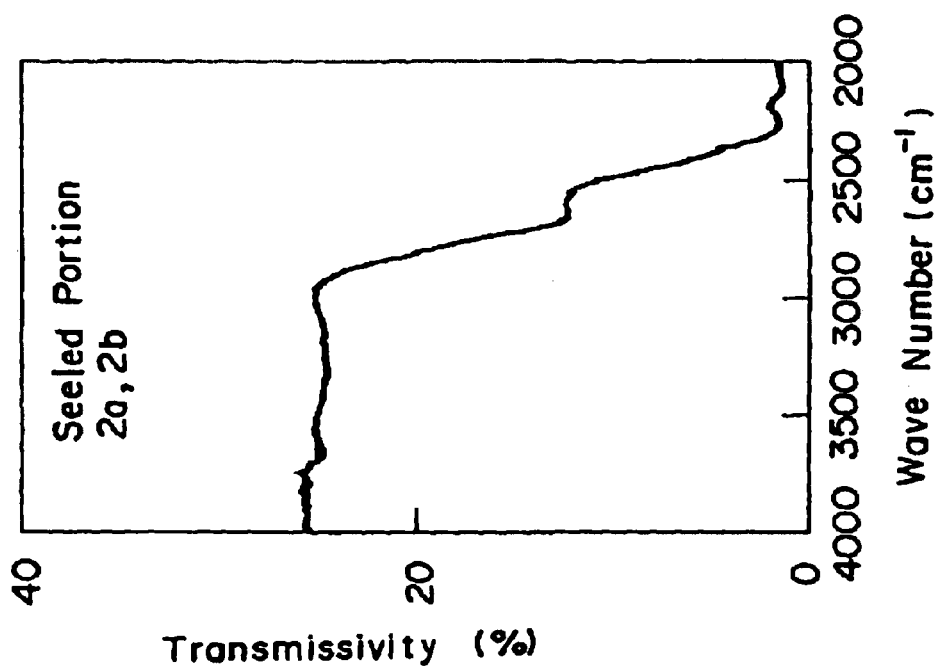
FIGS. 2A and 2B are graphs showing the spectral transmittance of the glass at the light-emitting portion and the sealing portion of the discharge lamp in accordance with the embodiment the present invention.

The discharge lamp of the present invention comprises at least a light-emitting portion formed of quartz glass, a sealing portion also formed of quartz glass and disposed adjacent to the light-emitting portion to seal a pair of electrodes, and a noble gas hermetically charged into the light-emitting portion.

Double-ended and single-ended lamps are also categorized as this kind of discharge lamp. In the case of the double-ended lamp, two electrodes used as a pair are disposed opposite to each other and disposed in a generally straight line inside the light-emitting portion, with a discharge gap provided between the tips of the electrodes.

The base portions of the electrodes are sealed by the sealing portions extending to both sides of the light-emitting portion and secured thereto. In the case of the single-ended lamp, two electrodes used as a pair are disposed in parallel, and the base portions of the electrodes are disposed in parallel in a single sealing portion.

As an example of a lamp, the double-ended lamp is generally configured as shown in FIG. 1A. More specifically, a generally tubular and partially spherical light-emitting portion and electrode sealing portions on both sides of the light-emitting portion are integrally formed of quartz glass, an electrode assembly is sealed at each sealing portion, the tip of each electrode projects into the light-emitting portion, and the electrodes are disposed opposite to each other with a discharge gap provided therebetween. Each electrode assembly includes a lead for connection to an external power source.

The lamp is formed of molten quartz glass, and the electrode assembly comprises an electrode, a lead foil connected to the electrode, and a lead connected to the lead foil.

Since the electrode projects into the light-emitting portion and discharge is generated directly, the electrode is made of a high-melting metal, preferably tungsten having a high melting point. The lead foil provides flexibility to the electrode structure to reduce application of external force to the sealed electrode, and is formed of molybdenum foil having high working performance.

Furthermore, the lead is made of a metal appropriately selected from among high-melting metals, preferably tungsten.

The light-emitting portion of the discharge lamp is charged with a noble gas and sealed. As the noble gas, argon, xenon or the like is used. The discharge lamp may include mercury or a metal halide as a light-emitting substance to adjust the hue of light.

The noble gas in the light-emitting portion of the discharge lamp in accordance with the present invention does not substantially include oxygen, hydrogen and their compounds. These elements and their compounds are confined as follows spectroscopically. In other words, the content of the elements and their compounds should be such that the maximum intensity of the spectral spectrum of the hydrogen, oxygen and their compounds existing in the light-emitting portion is 1/1000 or less of the intensity of the main light-emitting spectral spectrum of the noble gas when glow discharge is carried out by supplying a current of 3 mA to the electrodes inside the light-emitting portion.

At the same time, the content of OH groups included in the quartz glass at the sealing portion for sealing and securing the electrode assembly in the lamp of the present invention should be 5 ppm or less by weight.

In the present invention, the content of oxygen, hydrogen and their compounds in the noble gas inside the light-emitting portion and the content of OH groups in the quartz glass in the sealing portion are confined at the same time as described above to prevent oxidation, melting and scattering at the tungsten electrodes, and to reduce and delay the clouding and devitrification of the quart glass at the internal surface of the light-emitting portion. During the use of the lamp for an extended period of time, the temperature of the OH groups in the sealing portion is maintained high and the OH groups move into the noble gas in the light-emitting portion, causing oxidation and volatilization of the tungsten electrodes.

Furthermore, the content of the OH groups in the quartz glass of the light-emitting portion is preferably 10 ppm or less by weight, more preferably 5 ppm or less by weight. Although the content of the OH groups included in the light-emitting portion is less than that included in the sealing portion in the absolute amount, the content of the OH groups should preferably be reduced, since the OH groups are discharged in the form of $H_2O$ inside the light-emitting portion during use for an extended period of time. Accordingly, in consideration of the resistivity against the devitrification of the light-emitting portion, the content of the OH groups included in the glass of a light-emitting portion 1 should preferably be nearly the same as that included in the glass of the sealing portions 2a, 2b, that is, 5 ppm or less (larger than 0).

In comparison with a discharge lamp wherein the content of the OH groups included in its light-emitting portion differs from that included in its sealing portions, the discharge lamp wherein the content of the OH groups included in its light-emitting portion is nearly equal to that included in its sealing portions is produced more easily and economically.

In addition, in the so-called metal halide lamp, wherein a metal halide is added to the interior the light-emitting portion 1 of a discharge lamp, the content of the OH groups included in the glass of the light-emitting portion 1 should be as less as possible so as to be advantageous in the life characteristic of the lamp. This is because the OH groups included in the glass accelerate the reaction between the metal halide and the glass (devitrification of glass), thereby deteriorating the glass (of the light-emitting portion 1) at an early stage.

In the present invention, the quartz glass of the sealing portion should preferably have residual compressive stress in the vicinity of the interface between the glass and the electrodes. The residual compressive stress should preferably be 25 MPa or more.

In the so-called metal halide lamp, wherein a metal halide is added to the interior of the light-emitting portion 1 of a discharge lamp, compressive stress being residual in the vicinities of electrodes 3 is particularly advantageous. The compressive stress prevents the metal halide from entering the vicinity of the interface between the glass and the electrodes 3 being low in temperature, and also prevents the vapor pressure of the metal halide from lowering, thereby improving the light-emitting characteristic of the lamp.

Although residual tensile stress may be caused in the glass of the light-emitting portion, the residual tensile stress should preferably be 48 MPa or less. In particular, this residual tensile stress should preferably be 7 MPa or less. The reduction of the residual tensile stress is effective in preventing the light-emitting portion from cracking. In particular, the residual tensile stress of the glass should be 3.5 MPa or less.

If the tensile stress existing on the outer surface of the light-emitting portion 1 is lower than the limit value of the tension strength of the quartz glass, about 48 MPa, no problem occurs in lamp operation. However, if the outer surface of the light-emitting portion 1 has flaws, the light-emitting portion 1 is broken (cracks) by an external force more easily, as the residual tensile stress is larger. For this reason, the residual tensile stress should preferably be 7 MPa or less, the design value of the tension strength of the general sheet glass. A discharge lamp having no outer tube is susceptible to external conditions, and the tensile stress of the lamp should preferably be lower. In particular, the tensile stress should preferably be 3.5 MPa (with a safety factor of about 2) or less.

Together with the noble gas, mercury is sealed inside the light-emitting portion of the discharge lamp of the present invention so that the lamp is used as a mercury lamp. Furthermore, together with the noble gas, a metal halide is sealed inside the light-emitting portion so that the lamp is used as a metal halide lamp.

In a light-emitting portion forming step (a) in the production method of the discharge lamp of the present invention, a quartz glass tube including an OH group content of 5 ppm or less is heated and softened to a desired shape to obtain the light-emitting portion. In an electrode sealing step (b), electrode assemblies are inserted into a straight tube portion leading to the light-emitting portion, and the straight tube portion is heated and softened to seal the electrodes. A dosing step (c) is provided to dose a predetermined amount of a light-emitting substance in a solid or liquid state, and a gas-charging step (d) is further provided to charge a predetermined amount of a noble gas in the light-emitting portion and to hermetically seal the portion. The above-mentioned production method is applicable to both the single-ended and double-ended lamps.

In this production method, a dry noble gas to be charged into the light-emitting portion in the gas-charging step should be such that the maximum intensity of the light-emitting spectral spectrum of hydrogen, oxygen and their compounds existing in the light-emitting portion is 1/1000 or less of the intensity of the main light-emitting spectral spectrum of the noble gas when glow discharge is carried out by supplying a current of 3 mA. In this production method, the content of the OH groups in the quartz glass of the sealing portion is set at 5 ppm or less by weight after the gas-charging step.

In particular, the method described below is preferably adopted as a method of producing double-ended lamps. The production method comprises:
(a) a light-emitting portion forming step wherein a quartz glass tube including an OH group content of 5 ppm or less by weight and closed at one end thereof is heated and softened to form a light-emitting portion having a predetermined shape;
(b) an electrode sealing step wherein a first electrode assembly is inserted from the open end portion of the quartz glass tube into a straight tube leading to the light-emitting portion and disposed at a predetermined position, the interior of the quartz glass tube is evacuated from the open end portion thereof, a dry noble gas having the atmospheric pressure or less is sealed, the open end portion is heated and softened so as to be closed, and the quartz glass tube portion, in which the first electrode assembly is disposed, is heated and softened so as to seal the first electrode assembly;
(c) a dosing step wherein the closed end portion of the straight tube portion leading to the light-emitting portion and not yet having an electrode to be sealed therein is opened, and a predetermined amount of a light-emitting substance in a solid or liquid state is inserted from the open end portion into the light-emitting portion at room temperature;
(d) a step of inserting a second electrode assembly from the end portion opened at the dosing step to the straight tube portion leading to the light-emitting tube portion and then disposing the second electrode assembly at a predetermined position;
(e) a gas-charging step wherein the quartz glass tube is evacuated from the open-end portion, a dry noble gas having the atmospheric pressure or less is sealed, and the open-end portion is heated and softened so as to be closed; and,
(f) an electrode-sealing step wherein the quartz glass tube portion, in which the second electrode assembly is disposed, is heated and softened so as to seal the second electrode assembly.

In the method in accordance with the present invention, at the gas-charging step, a noble gas including hydrogen, oxygen and their compounds, the content of which is such that the maximum light emission intensity thereof is $\frac{1}{1000}$ or less of the light emission intensity of the noble gas when a current of 3 mA is supplied to a completed discharge lamp to cause glow discharge, is sealed. Furthermore, at the electrode sealing steps of sealing the first and second electrode assemblies, the quartz glass tube is heated and softened by the irradiation of laser or plasma, and the first and second electrode assemblies are sealed.

Another method in accordance with the present invention comprises:
(a) a light-emitting portion forming step wherein a quartz glass tube containing an OH group content of 5 ppm or less by weight is heated and softened to a light-emitting portion having a predetermined shape;
(b) a dosing step wherein a first electrode assembly and a second electrode assembly are inserted from the open-end portions of the quartz glass tube into a straight tube leading to the light-emitting tube portion and disposed at predetermined positions, and a predetermined amount of a light-emitting substance in a solid or liquid state is inserted to the light-emitting tube portion at room temperature at the same time;
(c) a gas-charging step wherein the quartz glass tube is evacuated from the open-end portions, a dry noble gas having the atmospheric pressure or less is sealed, and the open-end portions are heated, softened and closed; and
(d) an electrode-sealing step wherein the quartz glass tube portion, in which the first and second electrode assemblies are disposed, is heated and softened to seal the first and second electrode assemblies.

At the gas-charging step of this production method, a noble gas including hydrogen, oxygen and their compounds, the content of which is such that the maximum light emission intensity thereof is $\frac{1}{1000}$ or less of the light emission intensity of the noble gas when a current of 3 mA is supplied to a completed discharge lamp to cause glow discharge, is sealed. Furthermore, in the electrode sealing steps of sealing the first and second electrode assemblies, the quartz glass tube is heated and softened by the irradiation of laser or plasma, and the first and second electrode assemblies are sealed. The second electrode assembly is sealed after the first electrode assembly is sealed.

In both the above-mentioned production methods, the content of water in the noble gas to be sealed in the light-emitting portion should preferably be 5 ppm or less in mole ratio in the gas-charging step, more preferably 1 ppm or less. For this reason, a step of eliminating all or part of hydrogen, oxygen and their compounds from the noble gas to be charged should preferably be included prior to the gas-charging step. As means for accomplishing this, the noble gas to be charged is cooled to solidify water included in the noble gas.

Also in the light-emitting portion forming step of the above-mentioned production method, the quartz glass tube is heated and softened by the irradiation of laser or plasma so that the light-emitting portion can be formed. Furthermore, the light-emitting portion forming step may be carried out in an atmosphere of a dry noble gas or nitrogen gas.

After the light-emitting portion forming step, the above-mentioned production method should include a heating step for heating the quartz glass tube at high temperature to eliminate the residual stress caused at the light-emitting portion. By this step, the residual tensile stress can be eliminated or reduced from the light-emitting portion.

The above production method should preferably include a desorption vacuum heat treatment step for heating the quartz glass tube in vacuum to eliminate water attaching to the surface of the glass. In the case when this step is included, all the steps after the vacuum heat treatment step can be carried out in the atmosphere of the dry noble gas or nitrogen gas while the surface of the quartz glass is not exposed to the air, whereby a lamp can be completed in this condition. The water content in the dry noble gas or nitrogen gas should preferably be 5 ppm or less, more preferably 1 ppm or less.

This desorption vacuum heat treatment Step is carrying out before the light-emitting portion forming Step. In particular, the irradiation of laser or plasma in the light-emitting portion forming Step is also used. This desorption vacuum heat treatment step can be carrying out after the light-emitting portion forming step and before the dosing step, or carried out after the electrode sealing step and before the dosing step.

As for the light-emitting substance used for the production method of the present invention, a vacuum heat treatment step for heat-treating the light-emitting substance in vacuum may be additionally carried out before or after the dosing step.

In order to prevent the light-emitting substance from being oxidized in the production steps, the straight tube portion extending from the light-emitting portion should preferably be heated and softened so as to seal the electrodes while part of the light-emitting portion is cooled at the electrode sealing step.

In the electrode sealing step, the straight tube portion should preferably be heated and softened until the quartz glass of the straight tube portion makes contact with the electrode at high temperature so as to seal the electrode.

Embodiments

In the discharge lamp shown in FIG. 1A, a nearly spherical light-emitting portion 1 is formed of quartz glass. On both sides of the light-emitting portion 1, sealing portions 2a, 2b are connected to the light-emitting portion 1. The tip portions 30 of a pair of tungsten discharge electrodes 3, 3 for introducing current to cause discharge in a sealed-in gas are disposed in the light-emitting portion 1.

Furthermore, as shown in FIG. 1B, a lead foil 4 made of molybdenum is connected to the discharge electrode 3, and the lead foil 4 is connected to an external current introduction lead wire 5 made of molybdenum, thereby forming an electrode assembly 6. In the electrode assembly 6, the base portion 31 of the discharge electrode 3, the entire lead foil 4 and part of the lead wire 5 on the tip side thereof are sealed in the quartz glass.

This kind of electrode assembly 6 has a foil sealing structure wherein the difference in thermal expansion coefficient between the electrode and the quartz glass is absorbed by the plastic deformation of the molybdenum foil 4.

In the example of the lamp shown in FIG. 1A, the inner capacity of the light-emitting portion 1 is about 0.45 cc, the diameter of the tungsten electrode 3 is 0.45 mm, and the gap between the two tungsten electrodes 3 in the spherical light-emitting portion 1, that is, the distance between the electrodes is 1.5 mm.

In the case of this example, argon gas used as a noble gas for assisting lamp starting and mercury 7 used as a light-emitting substance are sealed inside the light-emitting portion 1 to form a high-pressure mercury lamp. In the above-mentioned example, the sealed amount of the mercury is about 90 mg, and the argon gas is sealed at a pressure of 200 mbars at room temperature.

Furthermore, the glass of the light-emitting portion 1 includes an OH group content of about 10 ppm in average by weight (an average value at several positions), and the glass of the sealing portions 2a, 2b includes an OH group content of about 5 ppm (an average value at several positions).

Figure 2B:
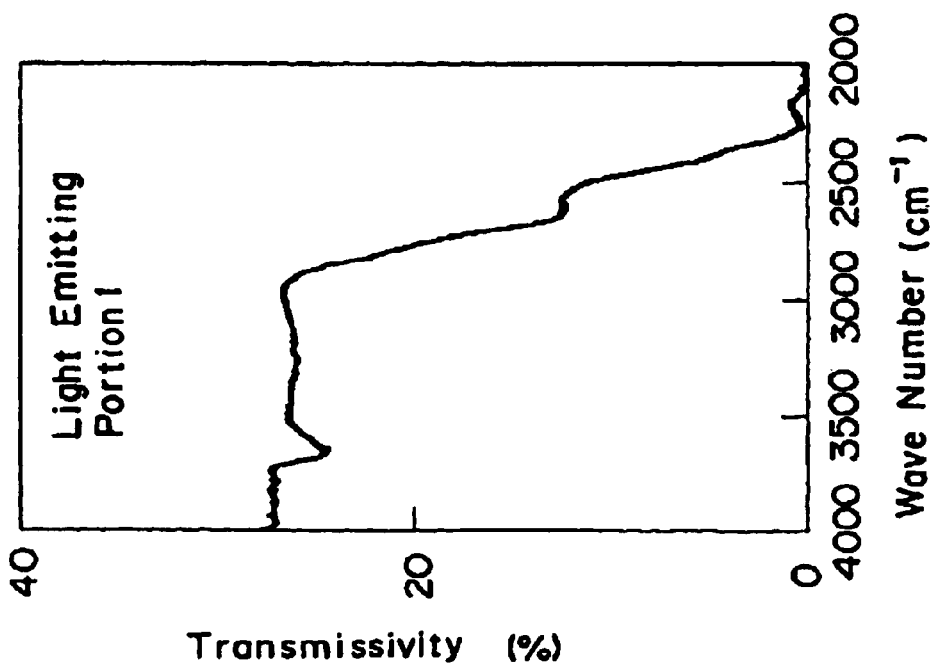

FIGS. 2A and 2B show the spectral transmittance in the infrared areas of the glass of the light-emitting portion 1 and the sealing portions 2a, 2b, (the abscissa represents wave number $cm^{-1}$, and the ordinate represents transmittance in percent). The content of OH groups in the glass was obtained by the ratio of the transmittance at a wave number of about 3846 $cm^{-1}$, and the transmittance at a wave number of about 3663 $cm^{-1}$.

Figure 3:
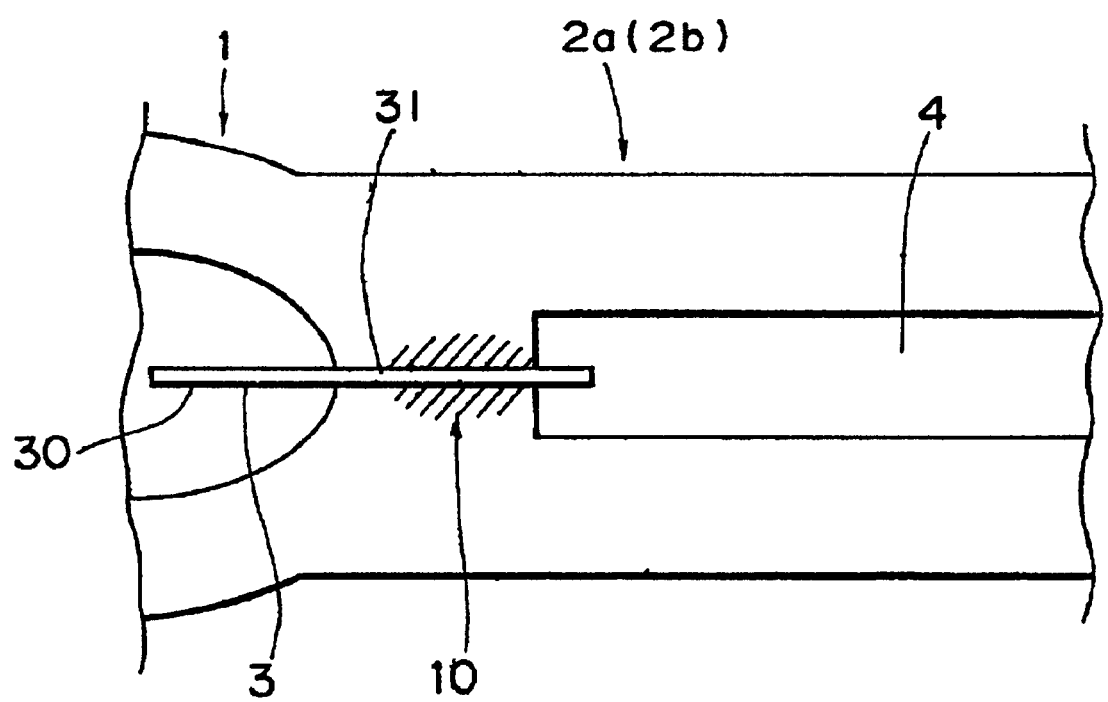
FIG. 3 is a partially sectional view showing the sealing portion of the discharge lamp in accordance with the embodiment of the present invention.

FIG. 3 is a magnified view showing the vicinity of the interface between the electrode 3 and the glass of the sealing portion 2a shown in FIG. 1A. As shown in the shaded area 10 of FIG. 3, in the discharge lamp of the present embodiment, compressive stress remains in the glass in the vicinity of the interface between the glass and the electrode 3 in parallel with the electrode. This residual stress was about 25 MPa, for example. In addition, a tensile stress of about 7 MPa was detected on the outer surface of the light-emitting portion 1.

Furthermore, in the discharge lamp of the present embodiment, the content of the hydrogen, oxygen and their compounds existing in the light-emitting portion 1, for example the content of water, is such that the light emission intensity of the content is $1/1000$ or less of the intensity of the main light-emitting spectrum of argon.

The light emission intensity was measured by using an automatic spectrometer. FIG. 4 shows a usable measuring instrument. This measuring instruction comprises an optical fiber 11 (3 m in length) for receiving the light of the glow discharge from the discharge lamp, a spectroscope 12 (Macfarson Corp., Model MC-209) having a transmission is light diffraction grating of 1200 G/mm, a multi-channel CCD detector 13 (Priston Instruments Corp., Model TE/CCD 1152UV) for detecting diffracted light, a CCD controller 14 (Priston Instruments Corp., Model ST-135) for controlling the CCD detector 13, and a personnel computer 15 (NEC, Model PC-9821) for displaying optical detection data from the detector 13.

Figure 5A:
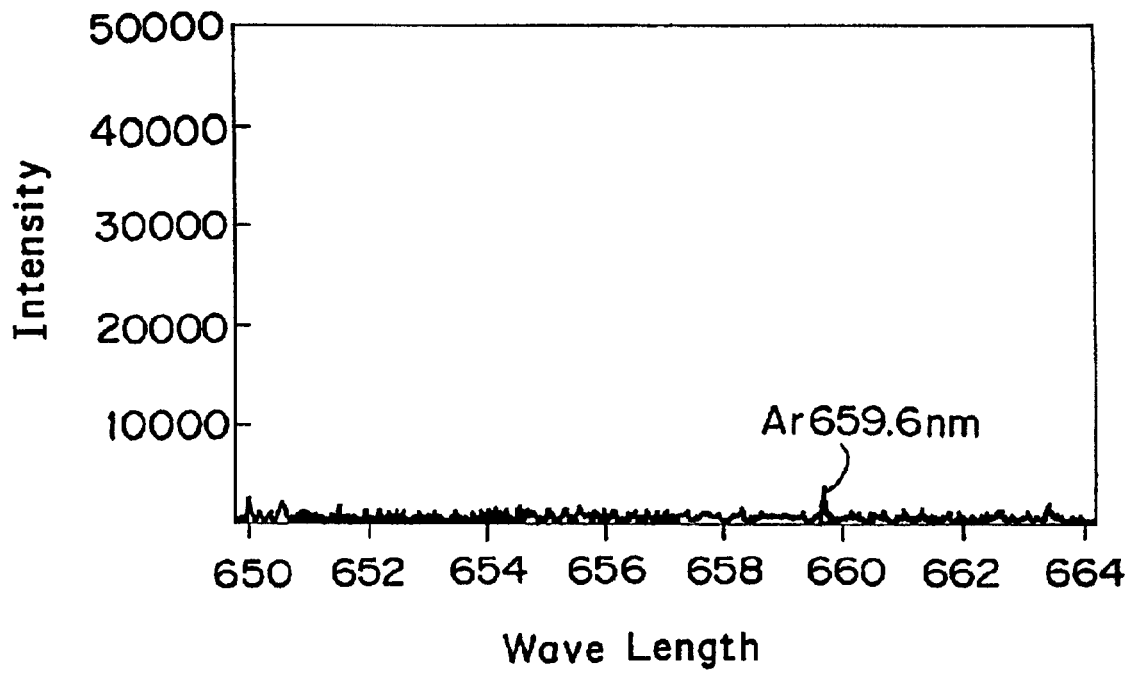
FIGS. 5A and 5B are graphs showing the intensity of light emission at the time of glow discharge in the discharge lamp in accordance with the embodiment of the present invention.
Figure 5B:
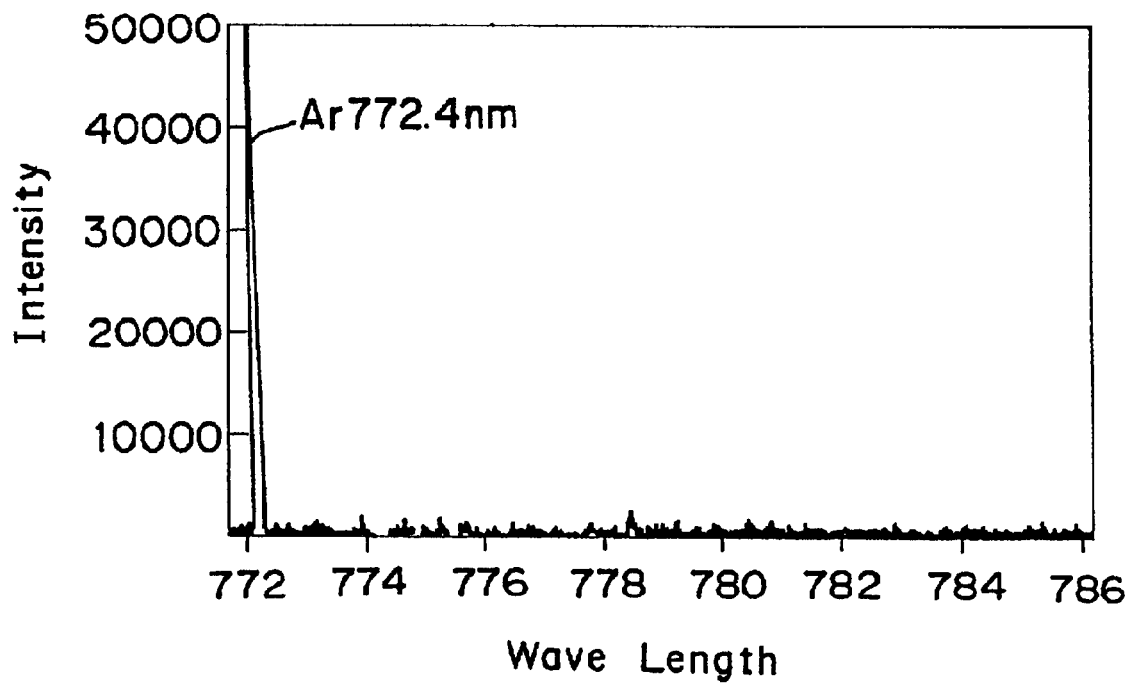

FIGS. 5A and 5B show the results of spectral measurements of hydrogen (H: a wavelength of 656.2 nm) and oxygen (O: wavelengths of 777.2 nm, 777.4 nm and 777.5 nm) at the time when a current of 3 mA was supplied and glow discharge was carried out in the lamp of the embodiment shown in FIG. 1A. The abscissa represents wavelength (nm), and the ordinate represents light emission intensity (in an arbitrary scale). The light emission of the hydrogen and oxygen was not detected.

The discharge lamp of the embodiment having the above-mentioned structure was lit at a constant rated power of 150 W, and the change in the luminous flux maintenance ratio with respect to lighting time was examined. The results were shown in TABLE 1.

TABLE 1

|  | Example | Comparison A | Comparison B | Comparison C |
|---|---|---|---|---|
| OH group content (ppm) in sealing portion | 5 | 10 | 5 | 10 |
| Light emission intensity ratio |  |  |  |  |
| H/Ar | 1/12000 | 1/12000 | 1/800 | 1/50 |
| O/Ar | 1/1000 | 1/1000 | 1/700 | 1/550 |
| HgH/Ar | 1/10000 | 1/10000 | 1/850 | 1/850 |
| flux maintenance ratio (%) |  |  |  |  |
| 10 Hr | 90 | 77 | 76 | 43 |
| 2000 Hr | 80 | 0 | 0 | 0 |

Wavelength H; 656 nm, O; 777.4 nm, HgH; 401.7 nm and Ar; 772.5 nm

In TABLE 1, the results of the following three lamps (comparisons A to C) were also shown as comparisons. In the case of the lamp of the comparison A, the content of OH groups in the glass of the sealing portions 2a, 2b was about 10 ppm. Except for this, the comparison A was formed in the same way as the lamp of the embodiment.

In the case of the lamp of the comparison B, the light emission intensity of the content of hydrogen (H), oxygen (O) and their compounds was detected at $1/1000$ or more of that of argon at a wavelength of 772.4 nm when glow discharge was carried out in the lamp at a current of 3 mA. Except for this, the comparison B has the same structure as that of the lamp of the embodiment.

In the case of the lamp of the comparison C, the light emission intensity of hydrogen (H), oxygen (O) and their compounds was detected at $1/1000$ or more of that of argon at a wavelength of 772.4 nm when the content of OH groups in the glass of the sealing portions 2a, 2b was about 10 ppm and when glow discharge was carried out in the lamp at a current of 3 mA. Except for this, the comparison C has the same structure as that of the lamp of the embodiment.

The luminous flux maintenance ratio of the lamp of the embodiment after 10 hours was excellent, 90%. Even after 2000 hours, 80% of luminous flux was able to be maintained. On the other hand, the luminous flux maintenance ratios of the lamps of the comparisons after 10 hours were improper, 80% or less. The lamps A, B and C were found severely blackened when inspected visually, and they became in non-lighting conditions (luminous flux maintenance ratios; 0%) until operation time reached 2000 hours.

As described above, when the content of OH groups in the glass of the sealing portions 2a, 2b is at a low level of about 5 ppm, and when the content of the of hydrogen (H), oxygen (O) and their compounds existing in the light-emitting portion 1 is such that the light emission intensity of the content is $\frac{1}{1000}$ or less of the light emission intensity of the noble gas when glow discharge is carried out in the lamp at a current of 3 mA, and when the intensity is at a negligible level, blackening due to light emission for an extended period of time is reduced, and the luminous flux maintenance ratio is excellent. It is thus found that the lamp has a long service life.

This is because the content of hydrogen (H), oxygen (O) and their compounds for easily causing oxidization and evaporation of the electrode 3 operating at high temperature and for accelerating blackening of the light-emitting portion 1 is very small, whereby blackening at the initial lighting time is prevented. In addition, the content of hydrogen (H), oxygen (O) and their compounds, which are released from the glass as the lighting time increases, is very low owing to a low content of OH groups in the glass of the sealing portions 2a, 2b.

Another characteristic of the lamp of the present embodiment is that the growth of cracks near the electrodes 3 is prevented at the sealing portions 2a, 2b, and that leakage (gas leakage) during lighting is scarce. This because compressive stress is present in the vicinity of the interface between the electrode 3 and the glass.

An example of a production method in accordance with the present invention will be described below referring to the flowchart of FIG. 6.

(1) In a light-emitting portion forming step (a bulb forming step), the central portion of a quartz glass tube was heated and softened so that a light-emitting portion 1 is formed by molding.

(2) In a first electrode sealing step, an electrode assembly 6 is inserted into one end of a straight tube adjacent to the light-emitting portion 1, and the tube is heated and softened to seal the electrode assembly 6, thereby to form a sealing portion 2a.

(3) In a dosing step, mercury 7 is dosed into the light-emitting portion 1 through the other end of the straight tube (formed into a sealing portion 2b) extending from the light-emitting portion 1.

(4) In a gas-charging step, argon gas is sealed in the light-emitting portion 1 through the same straight tube portion at 200 mbars.

(5) In a second electrode sealing step, another electrode assembly 6 is inserted into the other end of the straight tube, the tube is heated and softened to seal the electrode assembly 6, thereby to form a sealing portion 2b just as in the case of the first electrode sealing step.

In the method of the present embodiment conforming to the above descriptions, the steps from the first electrode sealing step (2) to the second electrode sealing step (5) are carried out in an atmosphere of dry argon gas (having a dew point of −76° C. and a water content of about 1 ppm in mole ratio).

In the above-mentioned discharge lamp production method, high-temperature evacuation heat treatment for eliminating OH groups in the glass is not included.

Figure 6:
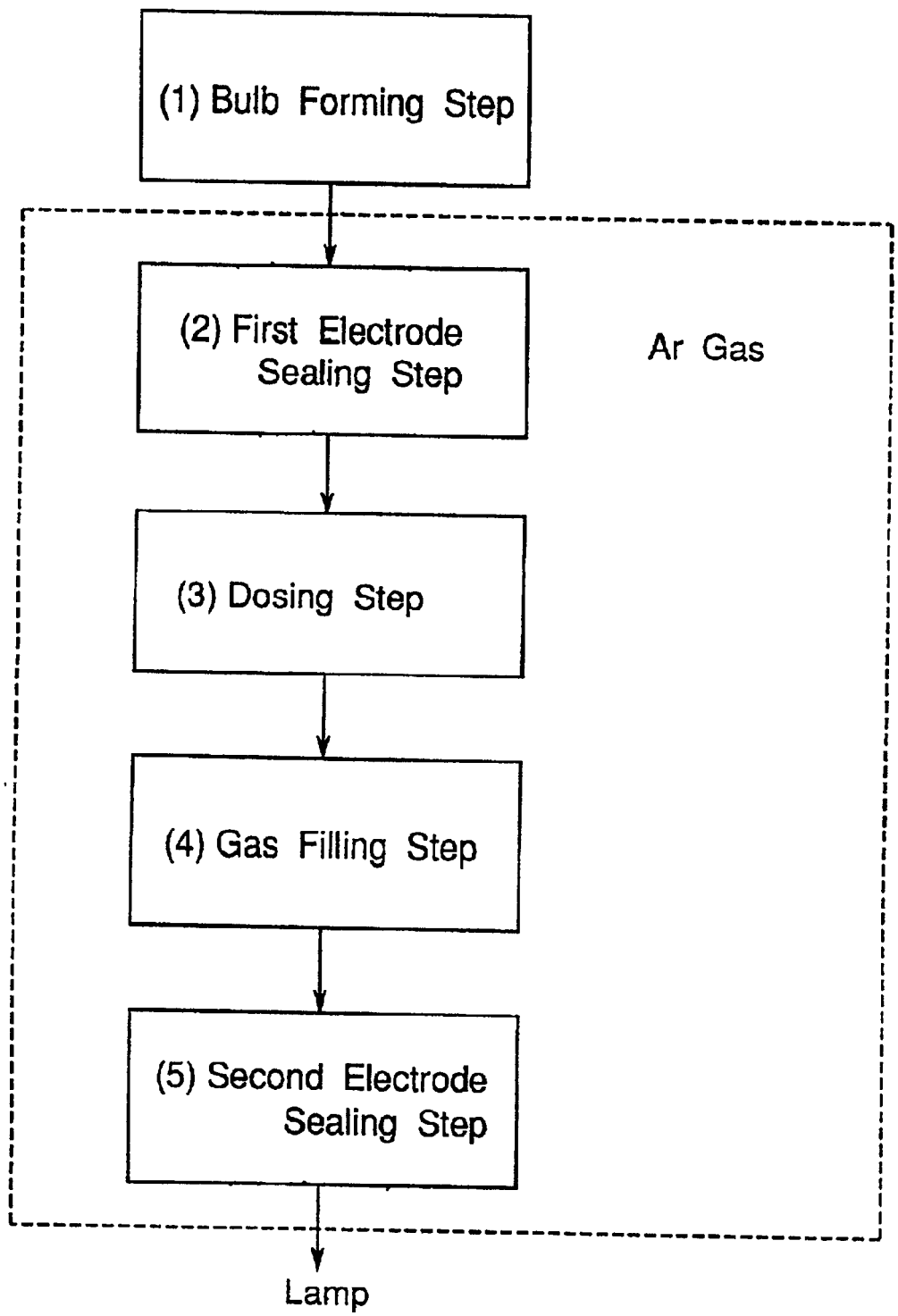
FIG. 6 is a flowchart showing a discharge lamp production method in accordance with an embodiment of the present invention.
Figure 7A:
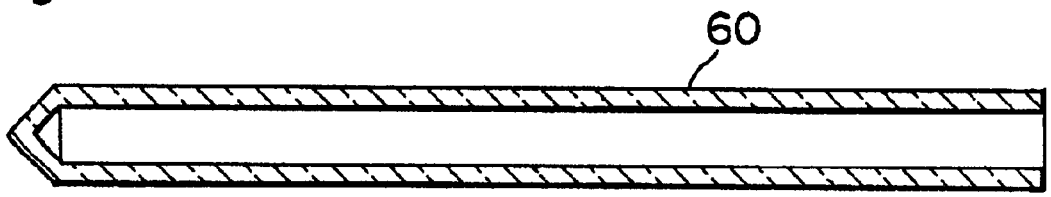
FIGS. 7A to 7D are sectional views showing quartz glass tubes in a step of forming the light-emitting portion of the discharge lamp in the production method in accordance with the embodiment of the present invention.

In the light-emitting forming step (1), FIGS. 7A to 7D show the steps included in the above-mentioned procedure shown in FIG. 6. First, as shown in FIG. 7A, a quartz glass tube 60 measuring about 6 mm in outer diameter and about 2 mm in inner diameter, one end of which is closed, is prepared. This quartz glass tube 60 includes an OH group content of about 5 ppm by weight. This kind of quartz glass tube has been produced and sold under the name of 214 Quartz Tube by General Electric Corp., for example, and can be easily available.

Figure 7B:
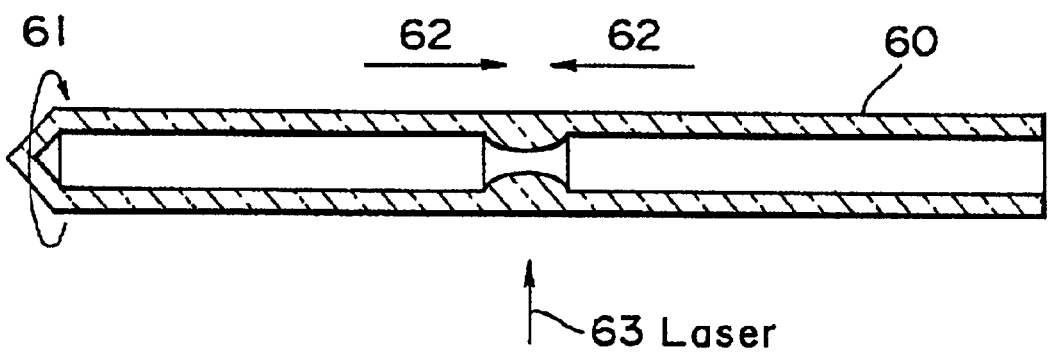

Next, both ends of the quartz glass tube 60 are held with a chuck (not shown) capable of rotating and moving both ends of the tube close to and away from each other. Furthermore, as shown in FIG. 7B, the central portion of the quartz glass tube 60 is heated and softened while the quartz glass tube 60 is rotated as indicated by arrow 62. This heating is carried out by using a propane burner indicated by arrow 63. After the heated portion becomes soft, both ends of the quartz glass tube 60 are moved so as to be close to each other as indicated by arrows 62, thereby to form a thick-walled portion 64 at the heated portion of the quartz glass tube 60.

Figure 7C:
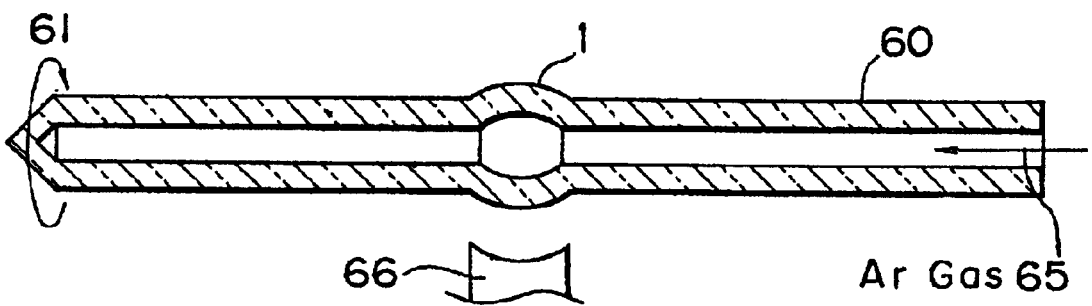
Figure 7D:
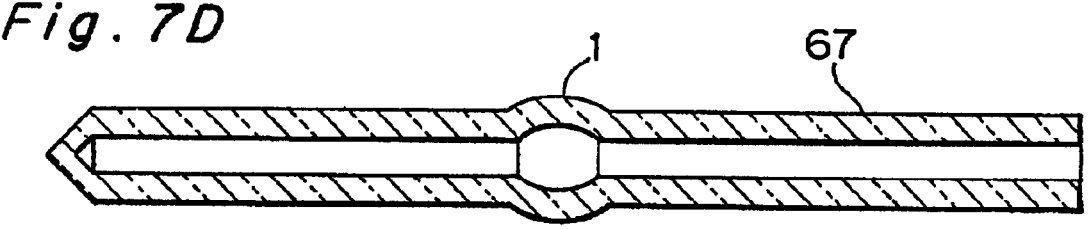

In addition, as shown in FIG. 7C, immediately after the heating is stopped, a mold 66 is disposed near the thick-walled portion 64. Concurrently with this, a high-pressure gas, such as argon gas, is introduced into the quartz glass tube 60 from the open end thereof to expand the thick-walled portion 64 along the contour of the mold 66 until the outer diameter thereof becomes about 11 mm. As a result, as shown in FIG. 7D, a quartz glass tube 67 having a light-emitting portion 1 formed thereon is obtained, thereby completing the light-emitting portion forming step.

In the light-emitting portion 1 formed as described above, the content of OH groups in the quartz glass increases up to about 10 ppm. This is because water generated by the combustion of propane enters the glass heated by the propane burner.

In addition, when the light-emitting portion 1 is formed by applying the mold 66 to the outer surface of the heated glass, the temperature of the outer surface becomes abruptly lower than that of the inner surface. For this reason, residual tensile stress remains on the outer surface of the light-emitting portion 1. The intensity of the stress is about 7 MPa at the light-emitting portion 1 having an outer diameter of about 11 mm. As the outer diameter is larger and the curvature thereof is smaller, the residual tensile stress becomes larger. When the outer surface is forcibly cooled by blowing nitrogen gas or the like thereto, the residual tensile stress becomes larger in the same way.

Figure 8A:
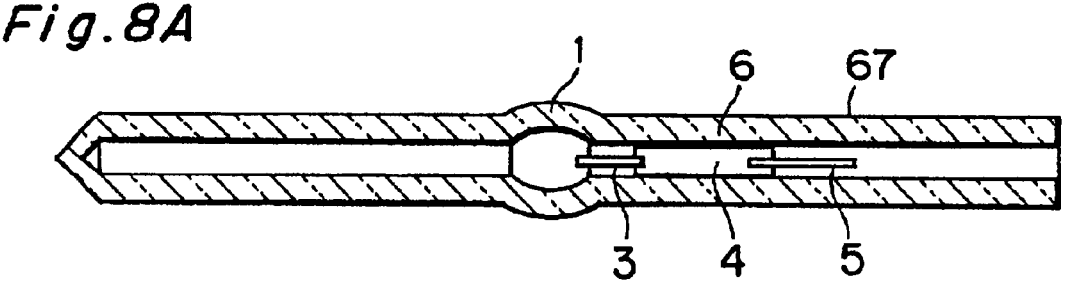
FIGS. 8A to 8D are sectional views showing quartz glass tubes in a step of sealing a first electrode in the discharge lamp in the production method in accordance with the embodiment of the present invention.

Next, the first electrode sealing step (2) of FIG. 6 is carried out in an atmosphere of dry argon gas (having a dew point of −76° C. and a water content of about 1 ppm, First, as shown in FIG. 8A, an electrode assembly 6 is inserted from the open end of the quartz glass tube 67 made at the light-emitting portion forming step and having the light-emitting portion 1, and the electrode assembly 6 is disposed inside the quartz glass tube 67 so that one end of the electrode 3 is disposed inside the light-emitting portion 1.

Figure 8B:
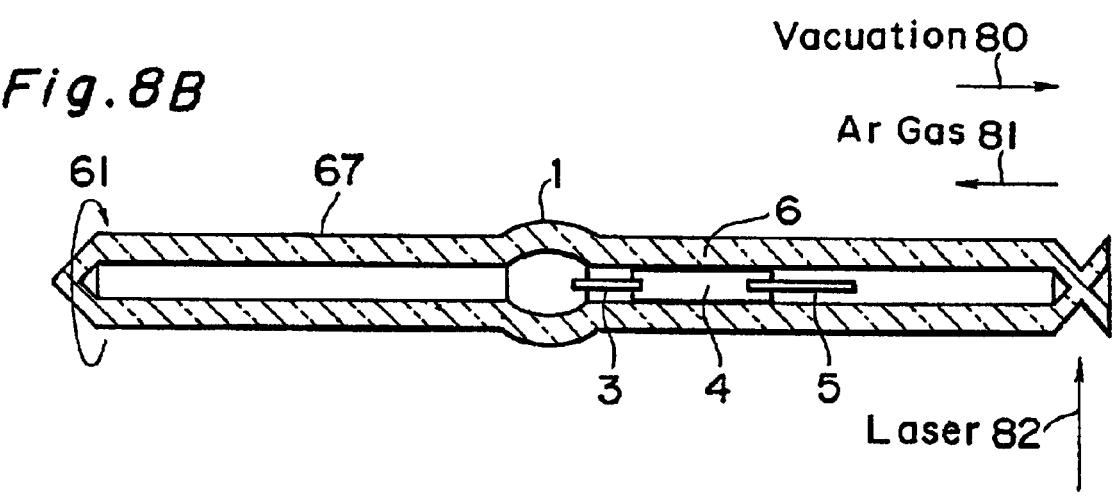

Next, as shown in FIG. 8B, the quartz glass tube 67, being in this condition, is first rotated as indicated by arrow 61, and the interior of the quartz glass tube 67 is evacuated as indicated by arrow 80 until the pressure therein becomes about $1 \times 10^{-3}$ Torr, preferably $1 \times 1C^{-4}$ Torr. Then, as indicated by arrow 81, an atmospheric gas, i.e., dry argon gas is introduced at a pressure of about 200 mbars. Next, the end portion of the quartz glass tube 67, into which the electrode assembly 6 has been inserted, is heated and softened so as to be sealed. This heating is carried out by using a $CO_2$ laser indicated by arrow 82.

The end of the quartz tube may be closed by a sailing cup or stopcock if the interior of the tube can remain sealed airtight from the exterior.

Figure 8C:
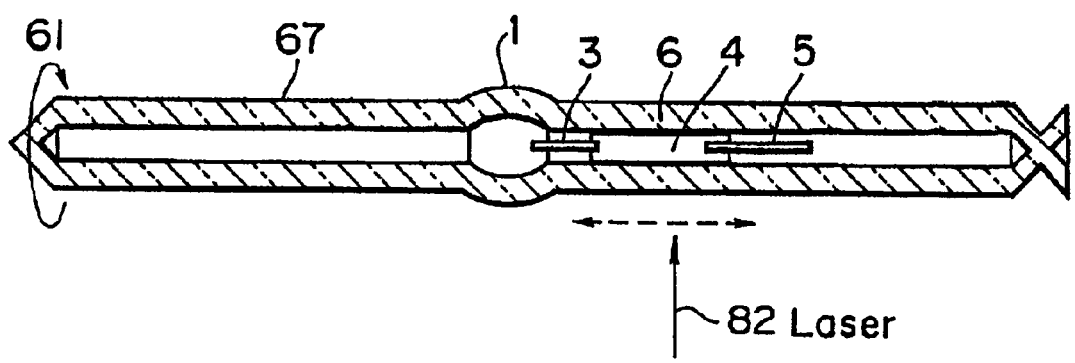

Next, as shown in FIG. 8C, the portion of the quartz glass tube 67 in the vicinity of the electrode assembly 6 is heated by the $CO_2$ laser indicated by arrow 82. At this time, the quartz glass tube 67 is rotated as indicated by arrow 61.

The $CO_2$ laser is moved laterally along an appropriate length in the direction from the electrode 3 to the molybdenum foil 4. However, the light-emitting portion 1 is not heated. Since the pressure inside the quartz glass tube 67 is low, 200 Torr, at this time, the heated portion of the quartz glass tube 67 shrinks because of the pressure difference between the inside and outside of the quartz glass tube 67 as the heated portion is softened.

The glass makes contact with the electrode 3, and the heat of the glass is sufficiently transferred to the electrode 3, whereby the electrode 3 is red-heated, and the quartz glass tube 67 shrinks to the extent that hermetic sealing can be maintained sufficiently at the molybdenum foil 4. When this condition is reached, heating is stopped. A heating time of about 30 seconds is necessary for a laser having an irradiation diameter of about 6 mm and an output of 200 W. Since the expansion coefficient of tungsten is about 10 times as high as that of quartz glass, compressive stress remains in the vicinity of the contact area of the electrode 3 and the glass as described referring to FIG. 3 while the heating is stopped and the electrode 3 becomes cool. This stress is about 25 MPa, for example.

The residual compressive stress at the above-mentioned sealing portion can be controlled depending on the time of heating near the electrode 3 or the output of the laser. As the time of heating and the output of the laser increase, the stress also increases. If control is performed so that the electrode does not make contact with the glass, no stress is generated.

Figure 8D:
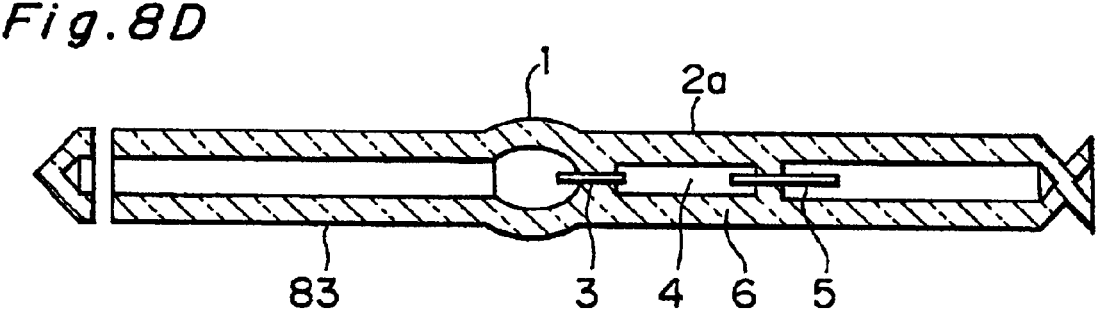

Finally, the end portion of the straight tube portion adjacent to the light-emitting portion 1, wherein the sealing portion 2a is not formed (the left side in FIG. 8C), is cut off (in the case of closing the tube by the cap or stopcock, it is opened). This completes a quartz glass tube 83 having the light-emitting portion 1 and the sealing portion 2a, in which the electrode assembly 6 is sealed and the residual compressive stress remains in the vicinity of the contact area of the electrode 3 and the glass, as shown in FIG. 8D. The first electrode sealing step is thus completed.

Since the irradiation of the $CO_2$ laser is used for heating at the first electrode sealing step, the content of OH groups in the glass at this sealing portion can be prevented from increasing. This is because water generation due to heating by the propane burner does not occur in the case of the laser heating. For this reason, the content of OH groups included in the sealing portion 2a can be maintained at about 5 ppm just as the content in the quartz glass tube 60 having not yet been processed.

Therefore, high-temperature evacuation heat treatment for eliminating OH groups from the glass is not particularly necessary. Hydrogen gas and water, which may deteriorate the service life characteristic of the lamp, are apt to be released from glass having undergone the high-temperature evacuation heat treatment. However, in the case of the lamp processed and completed as described above, hydrogen gas and water are less released, whereby the service life of the lamp is extended.

Furthermore, as shown in FIG. 8C, in the process of heating the portion of the quartz glass tube 67 in the vicinity of the electrode assembly 6 by using the $CO_2$ laser, if the heated portion of the quartz glass tube 67 shrinks when the quartz glass tube 67 is heated by using the $CO_2$ laser, the sealing pressure inside the tube can be made higher than 200 mbars, for example, 300 mbars or more.

Moreover, the interior of the tube can be in a vacuum condition without sealing a gas. Besides, if the electrode assembly 6 is not oxidized during heating, another gas, such as dry nitrogen gas, can also be used as a gas to be introduced.

Furthermore, in FIG. 8C, when the electrode assembly 6 is sealed, the heated portion of the quartz glass tube 67 can be tightened by holding or pressing with a pair of heat-resistant holding pieces, in addition to the shrinkage of the heated portion due to the pressure difference between the inside and outside of the quartz glass tube 67.

Moreover, although the $CO_2$ laser is moved laterally along an appropriate length in the direction from the electrode 3 to the molybdenum foil 4, the laser may be moved in the direction from the molybdenum foil 4 to the electrode 3, or may reciprocate laterally. Besides, if the laser has a large irradiation diameter enough to cover a necessary sealing width, it is not necessary to move the laser laterally.

Next, the dosing step (3) of FIG. 6 will be described below referring to FIG. 9.

Figure 9:
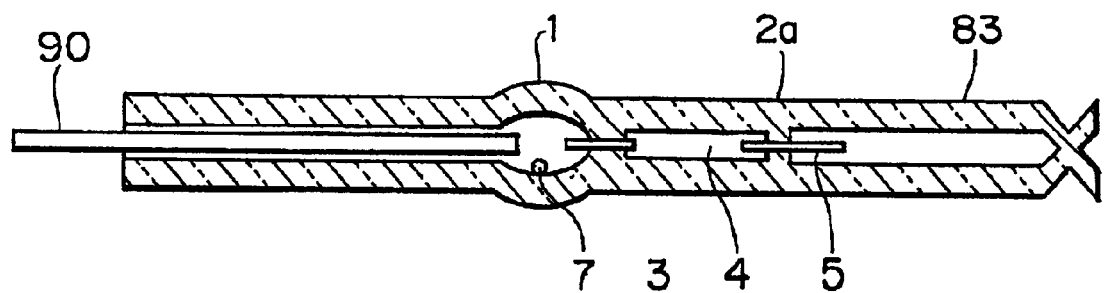
FIG. 9 is a sectional view showing a quartz glass tube in a dosing step in the discharge lamp production method in accordance with the embodiment of the present invention.

At the dosing step, as shown in FIG. 9, mercury 7 is introduced from the open end of the quartz glass tube 83 into the light-emitting portion 1. This is carried out by inserting a tubular needle 90 from the open end and by stopping the needle when the tip of the needle comes close to the center of the light-emitting portion 1.

The tubular needle 90 communicates with a dry argon gas source, and the flow of this gas through the tubular needle 90 pushes the mercury 7. Just as the first electrode sealing step, the dosing step is also carried out in an atmosphere of dry argon gas (having a dew point of −76° C.).

Figure 10A:
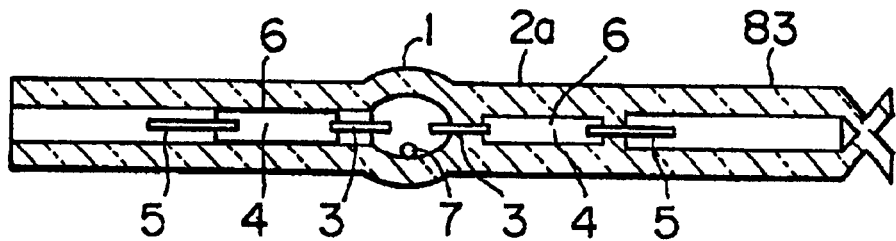
FIGS. 10A to 10E are sectional views showing quartz glass tubes in a gas-charging step and a second electrode sealing step in the production method in accordance with the embodiment of the present invention.

Next, the gas-charging step (4) and the second electrode sealing step (5) shown in FIG. 6 will be described below. As shown in FIG. 10A, another electrode assembly 6 is inserted from the open end of the quartz glass tube 83, in which the mercury 7 has been dosed. The electrode assembly 6 is disposed inside the quartz glass tube 83 so that the tip of the electrode 3 is disposed at a position about 1.5 mm away from the tip of the electrode 3 on the side of the sealing portion 2a inside the light-emitting portion 1.

Figure 10B:
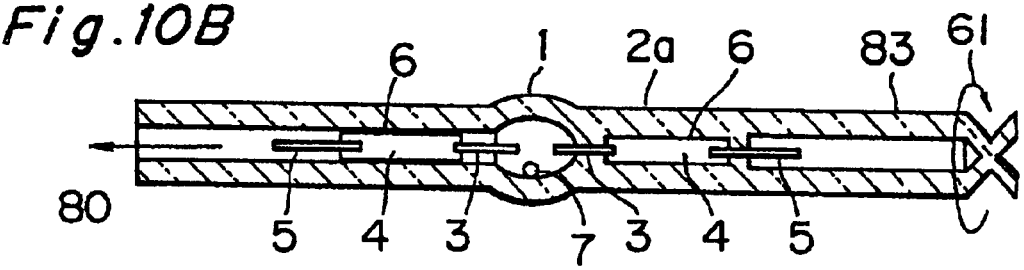

As shown in FIG. 10B, the quartz glass tube 83, being in this condition, is first rotated as indicated by arrow 61, and the interior of the quartz glass tube 83 is evacuated as indicated by arrow 80 until the pressure therein becomes about $1 \times 10^{-3}$ Torr. Then, as indicated by arrow 81 in FIG. 10C, the atmospheric gas, i.e., the dry argon gas (having a dew point of −76° C. and a water content of about 1 ppm in mole ratio) is introduced at a pressure of about 200 mbars. Next, the portion in the vicinity of the open end of the quartz glass tube 83, into which the electrode assembly 6 has been inserted, is heated and softened by using the $CO_2$ laser indicated by arrow 82 to seal the open end.

Figure 10C:
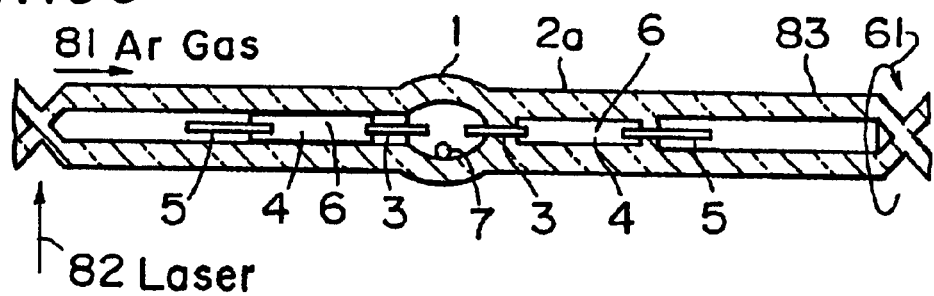
Figure 10D:
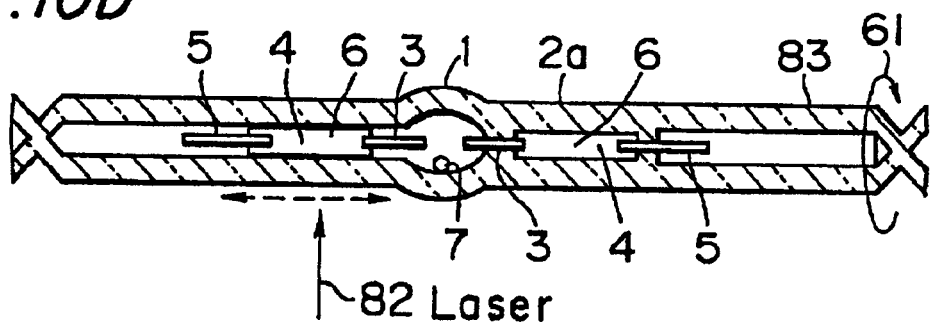

Then, as shown in FIG. 10D, the portion of the quartz glass tube 83 in the vicinity of the unsealed electrode assembly 6 is heated by the $CO_2$ laser indicated by arrow 82 is to seal the second electrode in the same way as shown in FIG. 8C.

Figure 10E:
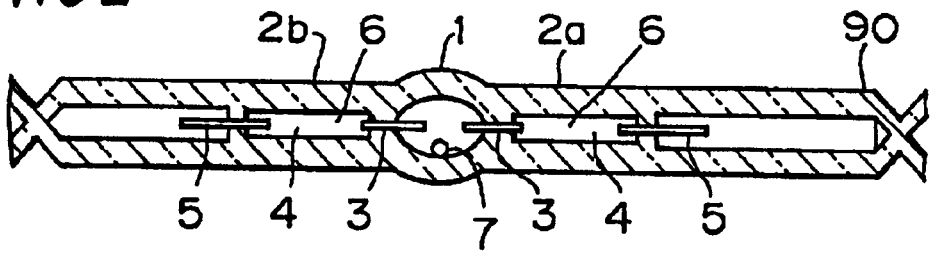

The above-mentioned procedure completes a quartz glass tube 90 having the light-emitting portion 1 and the sealing portions 2a, 2b, in which the electrode assemblies 6 are sealed, and residual compressive stress remains near the contact areas of the electrodes 3 and the glass, as shown in FIG. 10E. In the light-emitting portion 1, the argon gas having a pressure of 200 mbars and the mercury 7 are hermetically charged. The gas-charging step and the second electrode sealing step are thus completed simultaneously. Finally, both ends of the quartz glass tube 90 shown in FIG. 10E are cut off to expose the lead wires 5 outside, whereby the discharge lamp shown in FIG. 1A can be completed.

Another characteristic of the discharge lamp production method of the embodiment is that the areas around the molybdenum foils 4 can be securely hermetically sealed without leaving argon gas bubbles, since the steps of sealing the electrode assemblies 6 (the first electrode sealing step shown in FIG. 8C and the second electrode sealing step shown in FIG. 10D) are carried out with both ends of the quartz glass tube being closed. In addition, since both ends of the quartz glass tube are closed simultaneously, impurities are completely prevented from entering the quartz glass tube from the outside. For this reason, the electrodes are not contaminated in this production method, whereby this production method is suitable for producing discharge lamps required to have longer service lives. In addition, since both ends are closed to completely prevent impurities from entering the quartz glass tube from the outside, the steps of heating and softening the quartz glass tubes 67 and 83 to seal the electrode assemblies 6 (the first electrode sealing step shown in FIG. 8C and the second electrode sealing step shown in FIG. 10D) can be carried out even in an atmosphere containing relatively large amounts of impurities adversely affecting the service life, for example, in the air.

In the steps of sealing the electrode assemblies 6 (the first electrode sealing step shown in FIG. 8C and the second electrode sealing step shown in FIG. 10D), relatively large amounts of silica ($SiO_2$) and silicon (Si) are evaporated when heated for an extended period of time by the laser. As a result, the cleanliness of the atmosphere of the argon is lowered. In particular, substances to be inserted into the light-emitting portion 1 at the dosing step and the gas-charging step are contaminated. Eventually, the service life of the completed lamp is shortened. As a result, much cost and time are required in many cases to eliminate quartz and silicon from the atmosphere of the argon gas. However, in the case of the production method of the present embodiment, laser heating can be carried out in areas other than the atmosphere of the argon gas, since both ends of the quartz glass tube are closed. Therefore, there is no need to worry about contamination by quartz and silicon being evaporated in the dosing step and the gas-charging step, whereby lamp production can be attained in cleaner conditions.

As described above, a lamp is completed by carrying out evacuation at least up to about $1 \times 10^{-3}$ Torr as shown in FIG. 10B, and by charging argon gas including a water content of about 1 ppm as shown in FIG. 10C. When glow discharge is carried out in this lamp at a current of 3 mA, the light emission intensity of hydrogen (H), oxygen (O) and their compounds is 1/1000 or less than that of argon, and is not detected substantially. The degree of vacuum attained by evacuation and the content of water in the sealed-in argon gas, indicated herein as examples, are preferable sufficient conditions. Even argon gas including a water content of about 5 ppm (having a dew point of about −65° C.), for example, is allowable.

The degree of vacuum attained by evacuation should preferably be higher, and the content of water in the sealed-in argon gas should preferably be lower to extend the service life of the lamp. A degree of vacuum of about $1 \times 10^{-10}$ Torr can be easily obtained at present by enhancing the evacuation capability of a vacuum pump. The lower limit of the content of water in the argon gas is practically about 0.001 ppm (having a dew point of about −110° C.) in mole ratio. This value is almost equal to the limit of detection. Accordingly, the content of water in the argon gas to be sealed is in the range from 0.001 ppm to 1 ppm.

The content of water in the atmospheric gas at the site where all the steps are carried out should be 5 ppm or less, preferably in the range from 0.001 ppm to 1 ppm, considering that the atmospheric gas can be used as a gas to be sealed in the light-emitting portion.

In the case of reducing the water content in argon gas, a method of introducing argon gas from an argon gas source into the quartz glass tube via means for eliminating water can be used more practically than a method of directly introducing argon gas of high quality from a high-quality argon gas source into the quartz glass tube.

Figure 11:
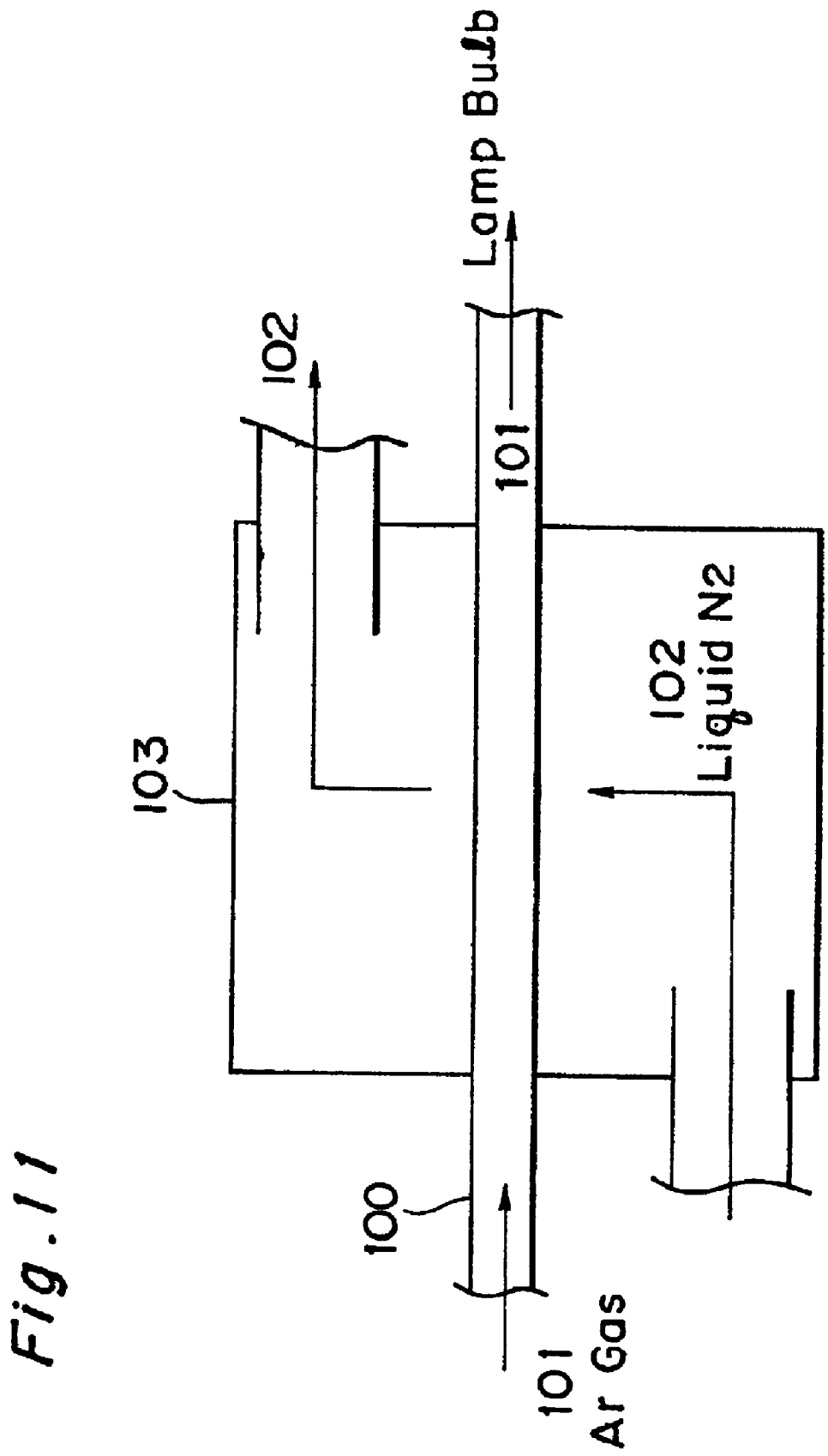
FIG. 11 is a sectional view showing an apparatus for eliminating water from sealed-in gas before the gas-charging step in the production method in accordance with the embodiment of the present invention.

As means for eliminating water, a cooling apparatus shown in FIG. 11 can be used. In this apparatus, argon gas indicated by arrow 101 is passed through a stainless steel tube 100. Liquid nitrogen indicated by arrow 102 is blown into a stainless steel container 103 to cool the interior of the container 103 to a temperature of −76° C. or less, thereby to lower the vapor pressure of the water in the argon. When the amount of the liquid nitrogen 102 to be blown is controlled to cool the argon gas to −110° C., or example, the content of water included in the argon gas can be lowered up to about 0.001 ppm in mole ratio. The temperature of the argon gas can be lowered to its melting point of −1900° C. The content of water can thus be reduced to about $9.2 \times 10^{-12}$ ppm.

Further, this method of using the cooling apparatus is effective in that the amount of water in the argon gas 101 can be indirectly controlled depending on the temperature of the coolant. Furthermore, this method is simpler in maintenance and control, and more practical than a production method wherein the content of water in a gas is directly controlled (a very expensive and highly precise analyzer is required). As other means for eliminating water, chemical and physical adsorbents, such as alumina, may also be used.

Furthermore, in FIG. 10D, in order to prevent the mercury 7 in the light-emitting portion 1 from being evaporated during laser heating, the light-emitting portion 1 can be cooled by blowing argon gas to the light-emitting portion 1 at a relatively high pressure, for example Furthermore, the light-emitting portion 1 can be cooled by contacting a tube, through which a coolant such as water, liquid nitrogen or the like flows, with the light-emitting portion 1 or by disposing the tube around the light-emitting portion 1.

Figure 12:
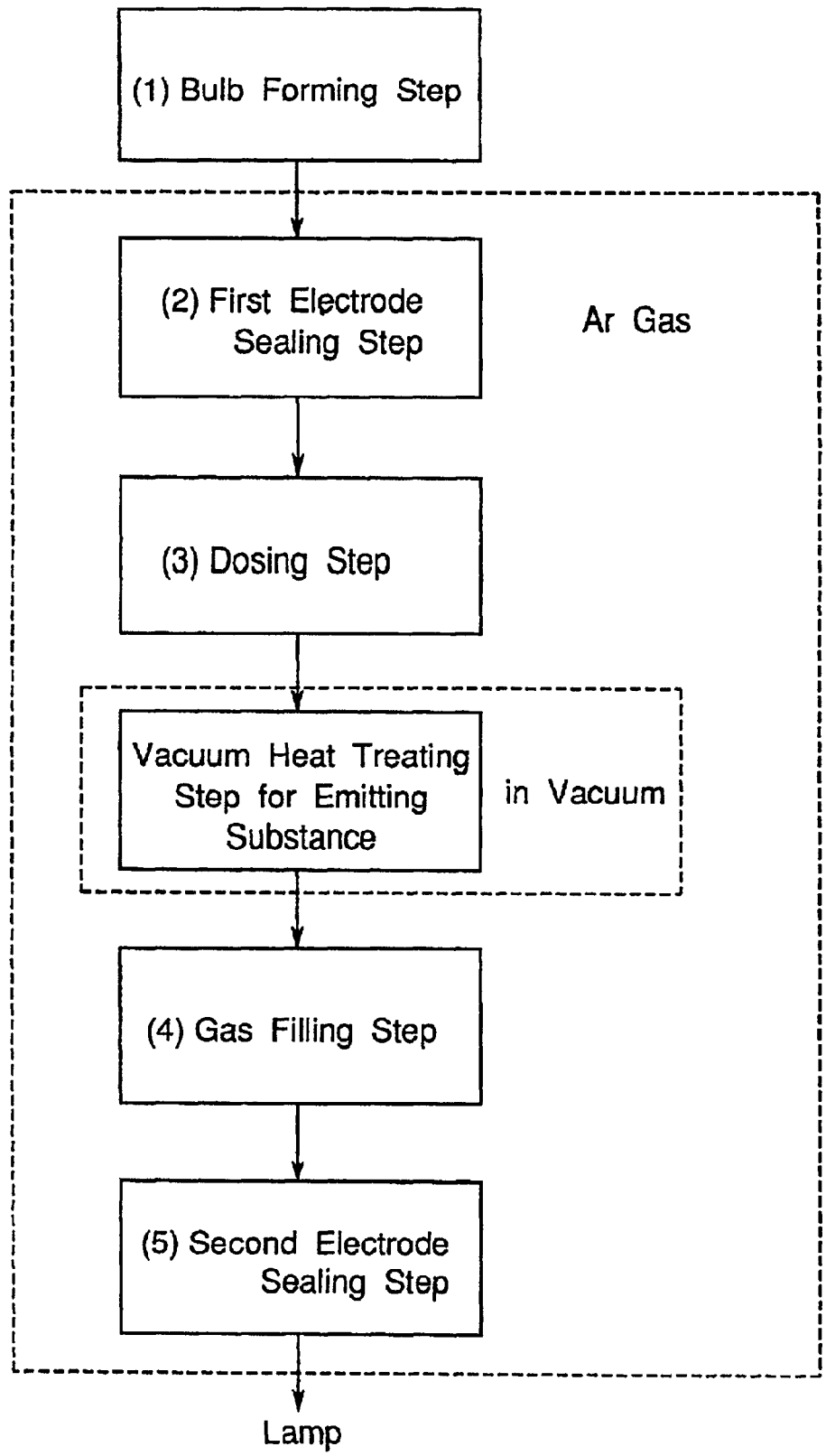
FIG. 12 is a flowchart showing a discharge lamp production method in accordance with another embodiment of the present invention.

In the present embodiment, a method of producing a discharge lamp with mercury sealed in as a light-emitting substance is described as an example. By using a method similar thereto, a metal halide lamp dosed with a metal halide can be produced. In this case, as shown in FIG. 12, a vacuum heat treatment step of heating the quartz glass tube 83 of FIG. 9 in vacuum can be added after the dosing step. This step is effective in eliminating water from a metal halide as a light emitting substance being highly adsorptive, and also effective in preventing the metal halide lamp from undergoing blackening and devitrification. However, the light-emitting substance must be prevented from being exposed to the air after the heat treatment.

Such a vacuum heat treatment for the light emitting substance may be carried out before the dosing step (3) which is indicated in FIG. 12.

With the production method of the present embodiment, a noble gas discharge lamp, in which mercury is not sealed, can be produced. In this case, the dosing step can be omitted.

The residual tensile stress at the light-emitting portion can be reduced by adding a heat treatment step after the light-emitting portion 1 is formed. The heat treatment step may be carried out between the light-emitting forming step and the first electrode sealing step.

In addition, processing by a $CO_2$ laser can be carried out at the light-emitting portion forming step. In this case, the content of OH groups in the light-emitting portion 1 is the same as that in the quartz glass tube 60 having not yet been processed, i.e., about 5 ppm. The step of forming the light-emitting portion 1 including this low content of OH groups is particularly effective in the production of metal halide lamps. The low content of OH groups further prevents the glass from reacting with a metal halide.

Figure 13:
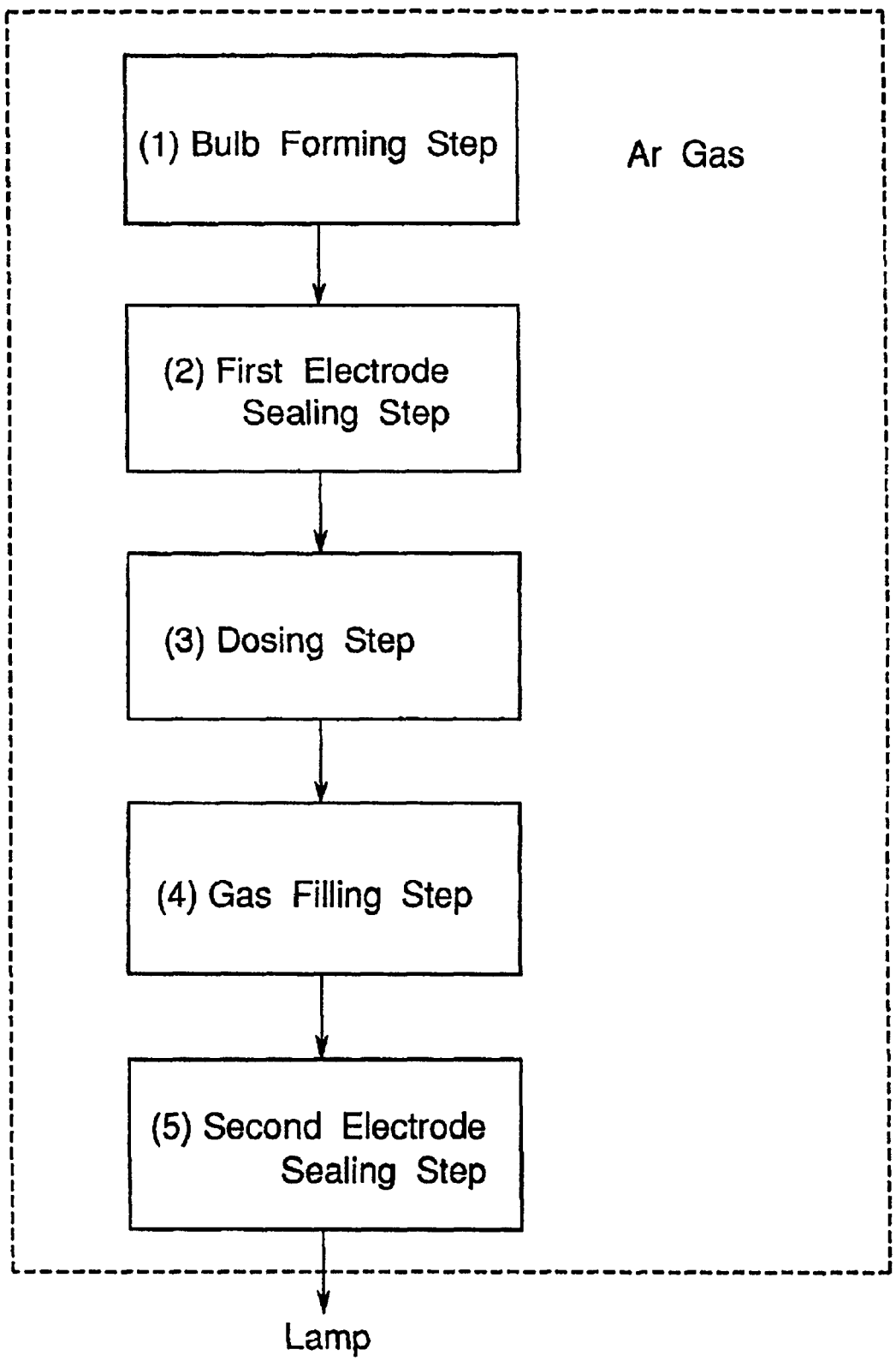
FIG. 13 is a flowchart showing a discharge lamp production method in accordance with yet still another embodiment of the present invention.
Figure 14:
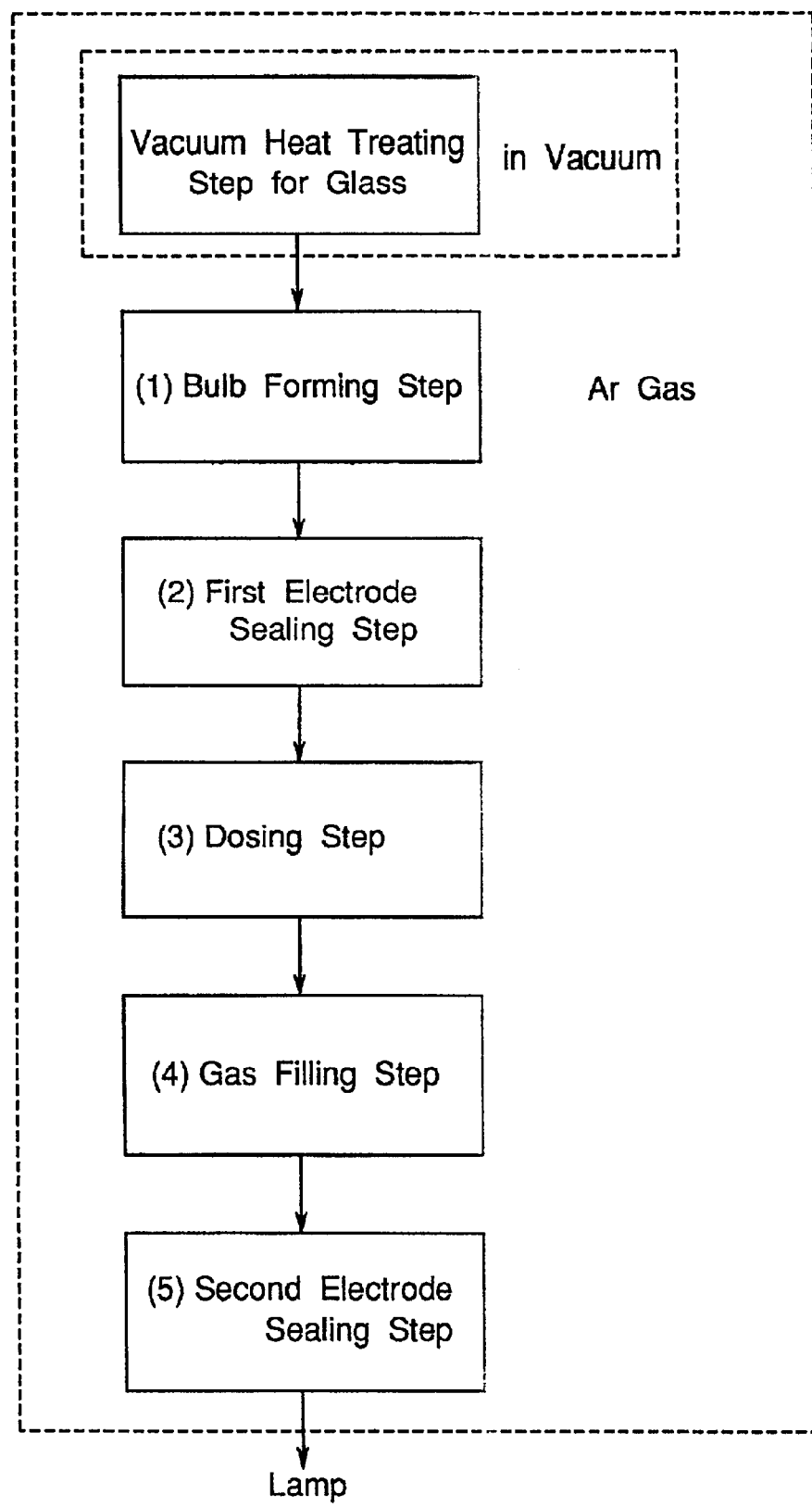
FIG. 14 is a flowchart showing a discharge lamp production method in accordance with a further embodiment of the present invention.

Furthermore, by using the $CO_2$ laser, the steps from the light-emitting portion forming step (a bulb forming step) to the completion of the lamp can be carried out in an atmosphere of dry argon gas as shown in FIG. 13. Moreover, a step of eliminating water adsorbed on the surface of the glass can be added as shown in FIG. 14. At this step, vacuum heat treatment is carried out at a temperature in the range of 100° C. to 1000° C. The temperature should preferably be in the range from 400° C. to 600° C. By processing the glass without exposing it to the atmospheric air after this step, adsorbed water does not remain in the light-emitting portion 1 as an impurity, whereby a discharge lamp having a longer service life can be produced.

The vacuum heat treatment for heat-treating the glass can be carried out between the light-emitting portion forming step and the first electrode sealing step or between the first electrode sealing step and the dosing step.

Besides, after the heat treatment, each step should preferably be completed while the temperature of the glass is maintained in the range of 100° C. to 300° C. This is more effective in eliminating adsorbed water.

A carbon dioxide laser or YAG laser can be used for laser irradiation to process the sealing portions, and argon plasma can be used for plasma irradiation.

Quartz glass including an OH group content of about 5 ppm or less is preferable as a starting material. In particular, quartz glass having lower content of OH groups is used.

Although argon gas is sealed as a noble gas, xenon gas or krypton gas can also be used as a noble gas. The discharge lamp production method of the present invention is not affected depending on the type of a noble gas to be sealed.

Furthermore, although the discharge lamp is produced in an atmosphere of dry argon in the present embodiment, the gas can be replaced with other dry non-oxidative gases, such as nitrogen gas.

The sealing work (shown in FIGS. 8D and 10D) conducted for the sealing portions 2a, 2b by using a laser, wherein there is no need to worry that the interior of the light-emitting portion 1 is exposed to the atmospheric air, can be carried out in the air.

A modified discharge lamp production method of the present embodiment will be described below referring to FIGS. 15A to 15F. This production method is characterized in that the first electrode sealing step (2), the dosing step (3), the gas-charging step (4) and the second electrode sealing step (5) in the flowchart shown in FIG. 6 are carried out simultaneously.

Figure 15A:
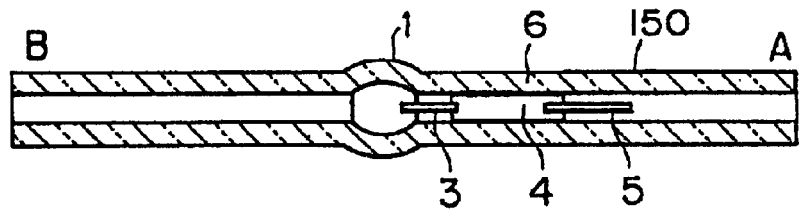
FIGS. 15A to 15F are sectional views showing quartz glass tubes in the discharge lamp production method in accordance with a modification of the embodiment of the present invention.

First, a light-emitting portion 1 is formed at the bulb forming step. A quartz glass tube 150 opened at both ends thereof is prepared. An electrode assembly 6 is inserted from one end A thereof, and disposed so that one end of the electrode 3 is disposed at a predetermined position inside the light-emitting portion 1 (FIG. 15A).

Figure 15B:
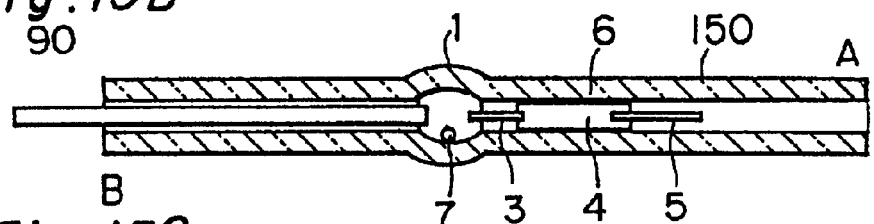
Figure 15C:
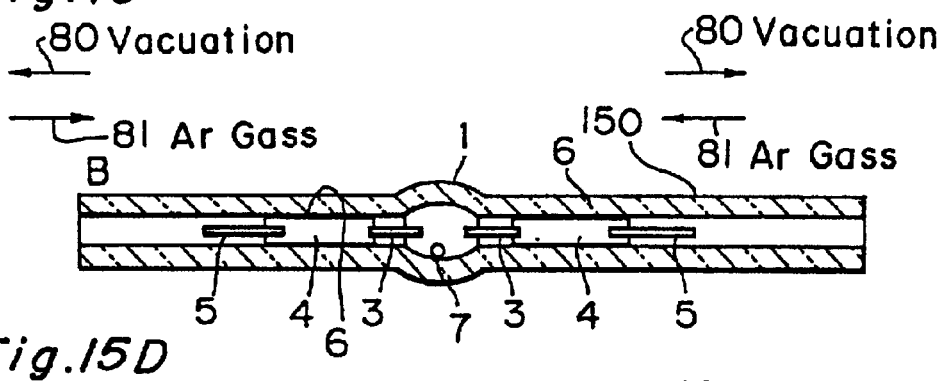

Next, mercury 7 is introduced from the other open end B into the light-emitting portion 1 through a tubular needle 90 (the dosing step shown in FIG. 15B). Next, another electrode assembly 6 is inserted from the same open end B and disposed so that one end of the electrode 3 is disposed at a predetermined position inside the light-emitting portion 1 (FIG. 15C).

Figure 15D:
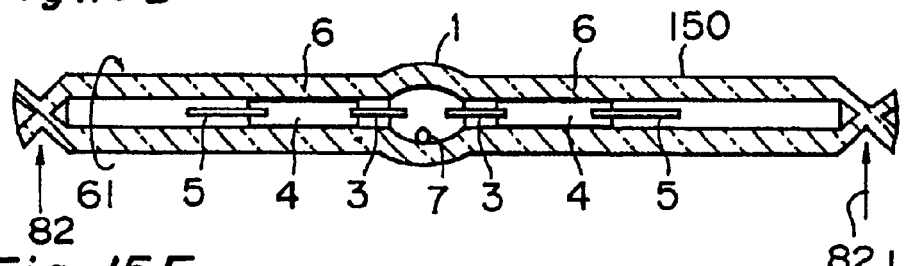

Next, the quartz glass tube 150, being in this condition, is rotated as indicated by arrow 61 as shown in FIG. 15D (this rotation is carried out by holding the vicinities of both ends of the quartz glass tube 150 with a rotatable chuck (not shown) and by rotating the chuck). The interior of the quartz glass tube 150 is evacuated from both ends A and B as indicated by arrow 80 until the internal pressure of the quartz glass tube becomes $1\times10^{-3}$ Torr or less. Hereafter, dry argon gas including a water content of 5 ppm or less, preferably 1 ppm or less, is introduced (as indicated by arrow 81) at a pressure if about 200 mbars. Both ends of the quartz glass tube 150 are then heated, softened and sealed (the gas-charging step). This heating is carried out by using a $CO_2$ laser indicated by arrow 82.

Figure 15E:
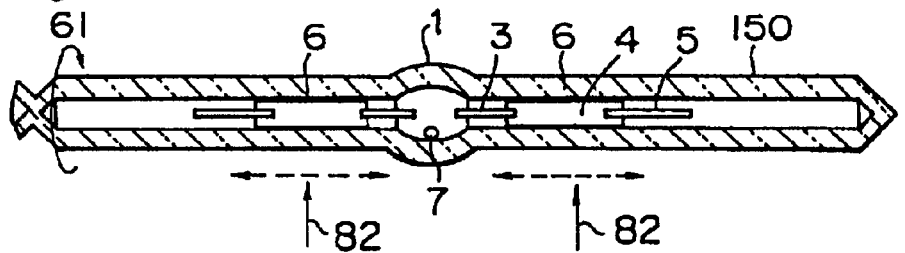

The portions of the quartz glass tube 150 in the vicinities of the electrode assemblies 6 are then heated and softened along an appropriate length in the direction from the electrode 3 to the molybdenum foil 4 by the $CO_2$ laser to seal the two electrode assemblies 6 (the first and second electrode sealing steps shown in FIG. 15E).

The two electrode assemblies 6 can be sealed simultaneously or may be sealed one by one in sequence.

Figure 15F:
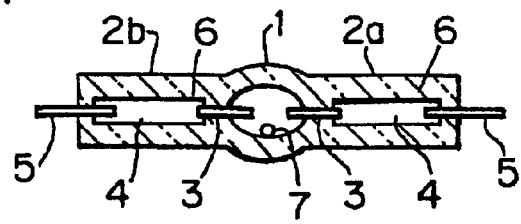
Figure 16A:
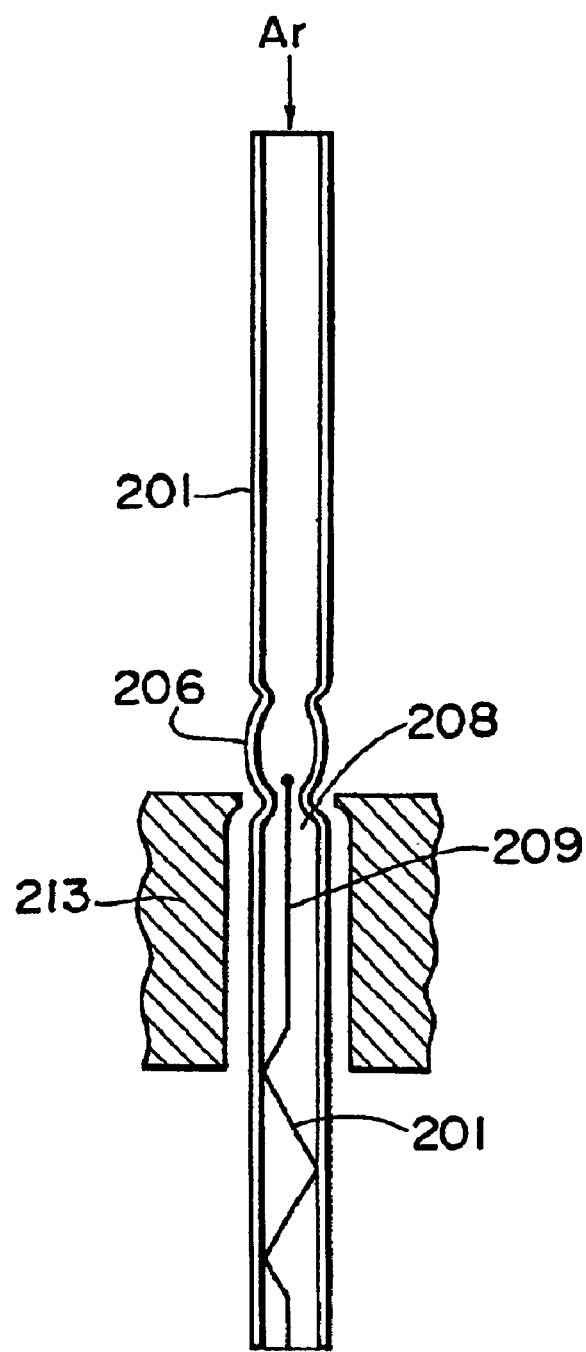
FIGS. 16A to 16B are sectional views showing quartz glass tubes in a conventional discharge lamp production method.
Figure 16B:
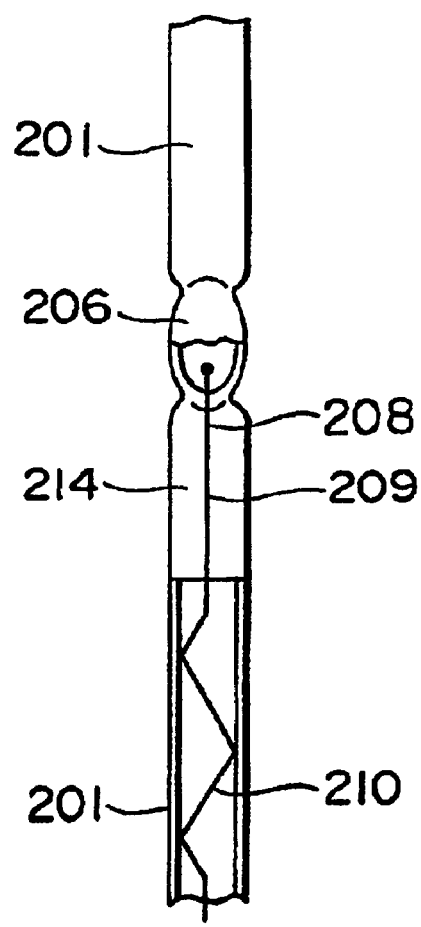

Finally, both ends of the quartz glass tube 150 are cut off so as to expose the lead wires 5 outside. As a result, a discharge lamp having the structure shown in FIG. 1 can be completed (FIG. 15F).

In the modified discharge lamp production method of the present embodiment, shown in FIGS. 15A to 15F, the first electrode sealing step (2), the dosing step (3), the gas-charging step (4) and the second electrode sealing step (5) shown in FIG. 6 are carried out simultaneously. Therefore, the time required for production can be reduced significantly, whereby the discharge lamp having the structure shown as the embodiment can be provided at low cost. Furthermore, unlike the process shown in FIG. 8D wherein the closed end of the quartz glass tube is cut off before the dosing step, the closed ends of the quartz glass tube are not cut off before the dosing step in the case of this production method. For this reason, small glass chips generated when the quartz glass tube is cut off can be completely prevented from entering the interior of the quartz glass tube, i.e., the interior of the light-emitting portion 1. Therefore, the amount of impurities in the light-emitting portion 1 can be ultimately reduced, whereby a discharge lamp having a further extended service life can be provided.

The present invention has been described by taking the preferred embodiment thereof. However, the above descriptions are not limited to the embodiment, but the embodiment can be modified variously as a matter of course. The discharge lamp production methods of the present invention, described by taking the present embodiments, are just examples, and the scope of the present invention will be determined in accordance with the claims hereto appended.

In the discharge lamp of the present invention, the content of hydrogen (H), oxygen (O) and their compounds existing in the light-emitting portion is confined to such a level that light emission is not detected substantially in a light detection time when glow discharge is carried out by a small amount of current. In addition, the content of OH groups in the quartz glass of the sealing portions is also confined in the range from 0 to 5 ppm by weight. Consequently, blackening and devitrification on the inner surface of the glass of the light-emitting portion due to the hydrogen, oxygen and water in the light-emitting gas during the use of the lamp can be prevented. As a result, a discharge lamp having a longer service life can be accomplished.

In the discharge lamp of the present invention, residual compressive stress is generated in the vicinity of the interface between the quartz glass of the sealing portions and the electrodes. For this reason, the glass is made close contact with the electrodes, the growth of cracks near the electrodes 3 is prevented, and leakage (gas leakage) during lighting is reduced. In particular, in the case of a metal halide lamp, a metal halide is prevented from entering the vicinity of the interface between the electrodes 3 and the glass, the vapor pressure of the metal halide is prevented from lowering, and the light-emitting characteristic of the lamp is enhanced.

In the discharge lamp production method of the present invention, the content of water in a noble gas to be charged is confined, whereby the content of hydrogen (H), oxygen (O) and their compounds existing in the light-emitting portion is confined to such a very low level that light emission is not detected substantially when glow discharge is carried out by a small amount of current. Consequently, blackening and devitrification on the inner surface of the glass of the light-emitting portion due to the hydrogen, oxygen and water in the light-emitting gas during the use of the lamp can be prevented. As a result, a discharge lamp having a longer service life can be produced.

In the method of the present invention, the quartz glass tube is heated and softened after the quartz glass tube is evacuated, a noble gas is charged, and both ends of the quartz glass tube are sealed at the steps of sealing the first and second electrode assemblies in the sealing portions. For this reason, the content of OH groups in the sealing portions can be reduced, and the electrodes can be prevented from being oxidized and contaminated, thereby being effective in preventing blackening and devitrification on the inner surface of the lamp during the use of the lamp for an extended period of time.

In the discharge lamp production method of the present invention, the quartz glass tube can be heated, softened and sealed by the irradiation of laser or plasma at the steps of sealing the electrode assemblies. For this reason, the content of OH groups in the glass of the sealing portions can be prevented from increasing. Consequently, it is possible to produce a discharge lamp free from the problems of blackening and devitrification on the inner surface of the lamp during the use of the lamp for an extended period of time.

What is claimed is:

1. A discharge lamp comprising a light-emitting portion formed of quartz glass, a pair of electrodes disposed in said light-emitting portion, sealing portions formed of quartz glass to hermetically seal said electrodes, and a noble gas charged in said light-emitting portion, wherein an a ratio of a maximum intensity of the emission spectrum of hydrogen, oxygen and their compounds, which are present in the light-emitting portion, to an intensity of a main light-emitting spectrum of the noble gas is, respectively, $\frac{1}{1000}$ or less when the noble gas is discharged by supplying a current of 3 mA to said electrodes in said light-emitting portion, and a content of OH groups included in the quartz glass of said sealing portions is 5 ppm or less by weight.

2. The discharge lamp according to claim 1, wherein the quartz glass of the sealing portions has a residual compressive stress in a vicinity of an interface between said quartz glass and said pair of electrodes.

3. The discharge lamp according to claim 2, wherein the residual compressive stress is 25 MPa or more and is not more than a breakage strength of said quartz glass.

4. The discharge lamp according to claim 1, wherein the content of OH groups in said quartz glass of said light-emitting portion is 10 ppm or less by weight, and a residual tensile stress in the quartz glass is 48 MPa or less.

5. The discharge lamp according to claim 4, wherein said residual tensile stress in the quartz glass of the light-emitting portion is 7 MPa or less.

6. The discharge lamp according to claim 4, wherein said residual tensile stress is 3.5 MPa or less.

7. The discharge lamp according to claim 4, wherein the content of OH groups in said quartz glass of said light-emitting portion is 5 ppm or less by weight.

8. The discharge lamp according to claim 1, wherein mercury is sealed together with the noble gas in the light-emitting portion.

9. The discharge lamp according to claim 1, wherein the noble gas and a metal halide are sealed in said light-emitting portion.

10. The discharge lamp according to claim 1, wherein the noble gas is argon gas.

* * * * *